(12) United States Patent
Kunitake et al.

(10) Patent No.: US 8,069,243 B2
(45) Date of Patent: Nov. 29, 2011

(54) DOCUMENT MANAGEMENT SERVER, METHOD, STORAGE MEDIUM AND COMPUTER DATA SIGNAL, AND SYSTEM FOR MANAGING DOCUMENT USE

(75) Inventors: Setsu Kunitake, Kanagawa (JP); Shigehisa Kawabe, Kanagawa (JP); Taro Terao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 702 days.

(21) Appl. No.: 11/671,519

(22) Filed: Feb. 6, 2007

(65) Prior Publication Data
US 2007/0299969 A1    Dec. 27, 2007

(30) Foreign Application Priority Data
Jun. 22, 2006   (JP) .................................. 2006-172736

(51) Int. Cl.
    *G06F 15/173*    (2006.01)
(52) U.S. Cl. ....................................... 709/225; 709/229
(58) Field of Classification Search .................. 709/229, 709/225; 707/200; 726/27
    See application file for complete search history.

(56) References Cited

U.S. PATENT DOCUMENTS

| | | | |
|---|---|---|---|
| 5,671,428 A | 9/1997 | Muranaga et al. | |
| 5,778,365 A | 7/1998 | Nishiyama | |
| 5,801,648 A | 9/1998 | Satoh et al. | |
| 5,806,078 A | 9/1998 | Hug et al. | |
| 5,897,643 A | 4/1999 | Matsumoto | |
| 5,940,617 A | 8/1999 | Tamura | |
| 5,940,830 A | 8/1999 | Ochitani | |
| 5,983,241 A | 11/1999 | Hoshino | |
| 6,094,654 A | 7/2000 | Van Huben et al. | |
| 6,289,460 B1 | 9/2001 | Hajmiragha | |
| 6,615,253 B1 | 9/2003 | Bowman-Amuah | |
| 6,662,230 B1 | 12/2003 | Eichstaedt et al. | |
| 7,051,275 B2 | 5/2006 | Gupta et al. | |

(Continued)

FOREIGN PATENT DOCUMENTS

CN    1577324    2/2005

(Continued)

OTHER PUBLICATIONS

Stoica et al., "A Scalable Peer-to-peer Lookup Service for Internet Applications"; MIT Laboratory for Computer Science; Aug. 27-31, 2001. San Diego, California, USA.

(Continued)

*Primary Examiner* — Andrew Caldwell
*Assistant Examiner* — Lin Liu
(74) *Attorney, Agent, or Firm* — Gesmer Updegrove LLP

(57) ABSTRACT

There is provided a document management server including a receiving unit that receives an access request and a first ID representing a document to be an object of the access request, an ID processing unit that issues, when an operation is performed on the document in response to the access request, a second ID corresponding to the operation, and records a derivation relationship having the second ID as a child of the first ID, an attribute recording unit that records attribute information relating to the operation by association with the first ID or the second ID, and a response data provider unit that provides, when the document is provided to the client in response to the access request, response data including attribute information associated with at least one ID appearing in a path from the received ID accompanying the access request to a root of a derivation relationship.

19 Claims, 17 Drawing Sheets

U.S. PATENT DOCUMENTS

| | | | |
|---|---|---|---|
| 7,086,003 | B2 | 8/2006 | Demsky et al. |
| 7,791,770 | B2 | 9/2010 | Nomura |
| 2002/0035525 | A1 | 3/2002 | Yokota et al. |
| 2002/0065812 | A1 | 5/2002 | Keith, Jr. |
| 2002/0091651 | A1 | 7/2002 | Petrogiannis et al. |
| 2002/0120506 | A1 | 8/2002 | Hagen |
| 2002/0154010 | A1 | 10/2002 | Tu et al. |
| 2002/0184366 | A1 | 12/2002 | Kimoto et al. |
| 2003/0154071 | A1 | 8/2003 | Shreve |
| 2003/0159035 | A1 | 8/2003 | Orthlieb et al. |
| 2003/0182262 | A1 | 9/2003 | Yamamoto et al. |
| 2004/0117363 | A1 | 6/2004 | Ohno |
| 2004/0205653 | A1 | 10/2004 | Hadfield et al. |
| 2004/0264811 | A1 | 12/2004 | Yano et al. |
| 2005/0004885 | A1 | 1/2005 | Pandian et al. |
| 2005/0021980 | A1 | 1/2005 | Kanai |
| 2005/0033777 | A1 | 2/2005 | Moraes et al. |
| 2005/0071755 | A1 | 3/2005 | Harrington et al. |
| 2005/0144308 | A1 | 6/2005 | Harashima et al. |
| 2005/0182785 | A1 | 8/2005 | Oswalt |
| 2006/0047922 | A1 | 3/2006 | Johnson et al. |
| 2006/0050648 | A1 | 3/2006 | Eydelman |
| 2006/0112139 | A1 | 5/2006 | Maple et al. |
| 2006/0122985 | A1 | 6/2006 | Yamamoto et al. |
| 2006/0136513 | A1 | 6/2006 | Ngo et al. |
| 2006/0161516 | A1* | 7/2006 | Clarke et al. ............ 707/2 |
| 2006/0294152 | A1 | 12/2006 | Kawabe et al. |
| 2007/0011211 | A1 | 1/2007 | Reeves et al. |
| 2007/0094740 | A1 | 4/2007 | Shudo |
| 2007/0112742 | A1 | 5/2007 | Dumais et al. |
| 2007/0130166 | A1 | 6/2007 | Takahashi |
| 2007/0139701 | A1 | 6/2007 | Nomura |
| 2007/0162441 | A1 | 7/2007 | Idicula et al. |
| 2007/0299969 | A1 | 12/2007 | Kunitake et al. |
| 2008/0005024 | A1 | 1/2008 | Kirkwood |
| 2008/0018926 | A1 | 1/2008 | Abraham et al. |
| 2008/0040388 | A1 | 2/2008 | Petri et al. |
| 2008/0115055 | A1 | 5/2008 | Sadovsky et al. |
| 2008/0177755 | A1 | 7/2008 | Stern et al. |
| 2009/0024647 | A1 | 1/2009 | Hein |
| 2009/0083831 | A1* | 3/2009 | Kanai ...................... 726/1 |
| 2009/0228969 | A1 | 9/2009 | Garg et al. |

FOREIGN PATENT DOCUMENTS

| | | | |
|---|---|---|---|
| EP | 1083492 | A2 | 3/2001 |
| JP | 62241061 | | 10/1987 |
| JP | 6077994 | | 3/1994 |
| JP | 7056794 | | 3/1995 |
| JP | 8292961 | | 11/1996 |
| JP | 9223056 | | 8/1997 |
| JP | 11053243 | | 2/1999 |
| JP | 11327980 | | 11/1999 |
| JP | 2000020377 | | 1/2000 |
| JP | 2000347943 | | 12/2000 |
| JP | 2001125812 | A | 5/2001 |
| JP | 2001350667 | | 12/2001 |
| JP | 2002014978 | | 1/2002 |
| JP | 2002016788 | | 1/2002 |
| JP | 3349978 | | 9/2002 |
| JP | 2002328865 | | 11/2002 |
| JP | 2003058395 | | 2/2003 |
| JP | 2003303122 | | 10/2003 |
| JP | 2004021529 | A | 1/2004 |
| JP | 2004110692 | | 4/2004 |
| JP | 2004310244 | A | 11/2004 |
| JP | 2005135211 | | 5/2005 |
| JP | 2005518602 | | 6/2005 |
| JP | 2005189995 | A | 7/2005 |
| JP | 2005338935 | | 12/2005 |
| JP | 2006024059 | | 1/2006 |
| JP | 2006053686 | | 2/2006 |
| JP | 2007004649 | | 1/2007 |
| KR | 1020060049337 | | 5/2006 |
| KR | 1020060092859 | | 8/2006 |
| WO | 03073272 | | 9/2003 |

OTHER PUBLICATIONS

Shigehisa Kawabe; Office Action mailed on Jan. 9, 2008 in corresponding U.S. Appl. No. 11/282,022, filed Nov. 17, 2005 for "Document Management Server, Document Management System, Computer Readable Recording Medium, Document Management Method, Client of Document Management System, and Node".

Shigehisa Kawabe; U.S. Appl. No. 11/282,022, filed Nov. 17, 2005 for "Document Management Server, Document Management System, Computer Readable Recording Medium, Document Management Method, Client of Document Management System, and Node".

Taro Takashima; U.S. Appl. No. 12/112,211, filed Apr. 30, 2008 for "Information Processing Apparatus, Information Processing System, Storage Medium, Information Processing Method, and Data Signal".

Taro Yashihama; U.S. Appl. No. 12/055,530, filed Mar. 26, 2008 for "Document Management Apparatus, Document Management System and Method, and Computer-Readable Medium".

Office Action issued on Feb. 21, 2009 from the Chinese Patent Office for corresponding Chinese Patent Application No. 200710005902.4, with English translation.

Korean Office Action with partial English translation, mailed on Dec. 2, 2008, corresponding to Korean Patent Application No. 10-2007-0058939.

Office Action for U.S. Appl. No. 11/282,022, filed Nov. 17, 2005; Shigehisa Kawabe; Document Management Server, Document Management System, Computer-Readable Recording Medium, Document Management Method, Client Management System, and Node.

U.S. Appl. No. 11/282,022, filed Nov. 17, 2005, Kawabe et al., Document Management Server, Document Management System, Computer Readable Recording Medium, Document Management Method, Client of Document Management System, and Node.

U.S. Appl. No. 11/671,519, filed Feb. 6, 2007, Kunitake et al., "Document Management Server, Method, Storage Medium and Computer Data Signal, and System for Managing Document Use".

U.S. Appl. No. 11/839,715, filed Aug. 16, 2007, Masao Nukaga; "Information-Processing Apparatus, Information-Processing System, Information-Processing Method, Computer-Readable Medium, and Computer Data Signal".

U.S. Appl. No. 11/753,690, filed May 25, 2007, Akira Suzuki.

U.S. Appl. No. 11/748,626, filed May 15, 2007, Kawabe et al.

Katsunori Houchi, U.S. Appl. No. 11/939,708, filed Nov. 14, 2007; Information Processing Apparatus, Information Processing System, Information Processing Method, and Computer Readable Storage Medium.

Setsu Kunitake, U.S. Appl. No. 11/942,943, filed Nov. 20, 2007; Information Processing Apparatus, Information Processing System, and Storage Medium.

Office Action for U.S. Appl. No. 11/753,690, mailed on May 28, 2009.

Office Action for U.S. Appl. No. 11/671,519, mailed on Jun. 2, 2009.

U.S. Office Action issued in connection with U.S. Appl. No. 11/753,690, mailed on Nov. 5, 2009.

U.S. Office Action issued in connection with U.S. Appl. No. 11/282,022, mailed on Dec. 11, 2009.

U.S. Office Action issued in connection with U.S. Appl. No. 11/942,943, mailed on Jan. 19, 2010.

English translation of Office Action issued in connection with Japanese Patent Application No. 2005-185934 mailed on Nov. 16, 2010.

Office Action issued in connection with U.S. Appl. No. 11/753,690 mailed on Jan. 3, 2011.

US Office Action issued in U.S. Appl. No. 11/942,943 mailed on Jun. 7, 2010.

US Office Action issued in U.S. Appl. No. 11/748,626 mailed on Jun. 10, 2010.

US Office Action issued in U.S. Appl. No. 11/282,022 mailed on Jul. 6, 2010.

US Office Action issued in U.S. Appl. No. 11/939,708 mailed on Jul. 27, 2010.

U.S. Office Action issued in U.S. Appl. No. 12/112,211 mailed on Aug. 31, 2010.

Tedjini, Mohamed et al. "A Query Service for a Software Engineering Database System," ACM 1990, pp. 238-248.

U.S. Office Action issued in U.S. Appl. No. 11/839,715 mailed on Oct. 7, 2010.

Office Action issued in connection with U.S. Appl. No. 11/748,626 mailed Nov. 26, 2010.

The Office Action mailed on Apr. 12, 2011, in connection with corresponding U.S. Appl. No. 11/942,943.

U.S. Office Action issued on May 9, 2011, in corresponding U.S. Appl. No. 12/055,530.

Japanese Notice of Grounds for Rejection issued on Aug. 9, 2011 in connection with the basic Japanese Patent Application No. 2006-172736 with excerpt English translation thereof.

* cited by examiner

| DOCUMENT ID | DESTINATION USER ID | EVENT | DATE AND TIME | PROVIDED DUPLICATE ID | OLD DUPLICATE ID |
|---|---|---|---|---|---|
| D01 | P01 | DOCUMENT REGISTRATION | 2006/03/03/10:00:00 | a | NULL |
| D01 | P03 | DUPLICATE PROVISION | 2006/03/03/10:20:08 | b | a |
| D01 | P04 | SHORTCUT PROVISION | 2006/03/03/10:22:32 | c | NULL |
| D01 | P04 | DUPLICATE PROVISION | 2006/03/03/10:22:40 | d | c |
| D01 | P08 | DUPLICATE PROVISION | 2006/03/03/10:31:21 | e | d |

| USER ID | EVENT | DATE AND TIME |
|---|---|---|
| P01 | DOCUMENT REGISTRATION | 2006/03/03/10:00:00 |
| P03 | READ (DUPLICATE PROVISION) | 2006/03/03/10:20:08 |

Fig. 9

| USER ID | EVENT | DATE AND TIME |
|---|---|---|
| P01 | DOCUMENT REGISTRATION | 2006/03/03/10:00:00 |
| P04 | SHORTCUT PROVISION | 2006/03/03/10:22:32 |
| P04 | READ (DUPLICATE PROVISION) | 2006/03/03/10:22:40 |
| P08 | READ (DUPLICATE PROVISION) | 2006/03/03/10:31:21 |

| DOCUMENT ID | DESTINATION USER ID | EVENT | DATE AND TIME | PROVIDED DUPLICATE ID | OLD DUPLICATE ID | DOCUMENT VERSION |
|---|---|---|---|---|---|---|
| D01 | P01 | DOCUMENT REGISTRATION | 2006/03/03/10:00:00 | a | NULL | VERSION 0 |
| D01 | P03 | DUPLICATE PROVISION | 2006/03/03/10:20:08 | b | a | ... |
| D01 | P04 | SHORTCUT PROVISION | 2006/03/03/10:22:32 | c | NULL | ... |
| D01 | P04 | DUPLICATE PROVISION | 2006/03/03/10:22:40 | d | c | ... |
| D01 | P04 | DOCUMENT UPDATE | 2006/03/03/10:31:21 | e | d | VERSION 1 |
| D01 | P06 | DUPLICATE PROVISION | 2006/03/03/10:35:10 | f | e | ... |
| D01 | P08 | DUPLICATE PROVISION | 2006/03/03/10:53:11 | g | e | ... |
| D01 | P08 | DOCUMENT UPDATE | 2006/03/03/10:56:57 | h | g | VERSION 2 |
| D01 | P11 | DUPLICATE PROVISION | 2006/03/03/10:59:20 | i | h | ... |

Fig. 12

| DOCUMENT ID | DESTINATION USER ID | EVENT | DATE AND TIME | PROVIDED DUPLICATE ID | OLD DUPLICATE ID | DIFFERENTIAL ID |
|---|---|---|---|---|---|---|
| D01 | P01 | DOCUMENT REGISTRATION | 2006/03/03/10:00:00 | a | NULL | ... |
| D01 | P03 | DUPLICATE PROVISION | 2006/03/03/10:20:08 | b | a | ... |
| D01 | P04 | SHORTCUT PROVISION | 2006/03/03/10:22:32 | c | NULL | ... |
| D01 | P04 | DUPLICATE PROVISION | 2006/03/03/10:22:40 | d | c | ... |
| D01 | P04 | DOCUMENT UPDATE | 2006/03/03/10:31:21 | e | d | DIFFERENTIAL 1 |
| D01 | P06 | DUPLICATE PROVISION | 2006/03/03/10:35:10 | f | e | ... |
| D01 | P08 | DUPLICATE PROVISION | 2006/03/03/10:53:11 | g | e | ... |
| D01 | P08 | DOCUMENT UPDATE | 2006/03/03/10:56:57 | h | g | DIFFERENTIAL 2 |
| D01 | P11 | DUPLICATE PROVISION | 2006/03/03/10:59:20 | i | h | ... |

Fig. 15

| DOCUMENT ID | DESTINATION USER ID | EVENT | DATE AND TIME | PROVIDED DUPLICATE ID | OLD DUPLICATE ID | DIFFERENTIAL ID | CONTROL INFORMATION |
|---|---|---|---|---|---|---|---|
| D01 | P01 | DOCUMENT REGISTRATION | 2006/03/03/10:00:00 | a | NULL | ... | ... |
| D01 | P03 | DUPLICATE PROVISION | 2006/03/03/10:20:08 | b | a | ... | ... |
| D01 | P04 | SHORTCUT PROVISION | 2006/03/03/10:22:32 | c | NULL | ... | ... |
| D01 | P04 | DUPLICATE PROVISION | 2006/03/03/10:22:40 | d | c | ... | ... |
| D01 | P04 | DOCUMENT UPDATE | 2006/03/03/10:31:21 | e | d | DIFFERENTIAL 1 | UNTIL 3/11 |
| D01 | P06 | DUPLICATE PROVISION | 2006/03/03/10:35:10 | f | e | ... | ... |
| D01 | P08 | DUPLICATE PROVISION | 2006/03/03/10:53:11 | g | e | ... | ... |
| D01 | P08 | DOCUMENT UPDATE | 2006/03/03/10:56:57 | h | g | DIFFERENTIAL 2 | UP TO 3 TIMES |
| D01 | P11 | DUPLICATE PROVISION | 2006/03/03/10:59:20 | i | h | ... | ... |

Fig. 17

DOCUMENT MANAGEMENT SERVER, METHOD, STORAGE MEDIUM AND COMPUTER DATA SIGNAL, AND SYSTEM FOR MANAGING DOCUMENT USE

CROSS-REFERENCE TO RELATED APPLICATIONS

This application is based on and claims priority under 35 USC 119 from Japanese Patent Application No. 2006-172736, filed on Jun. 22, 2006.

BACKGROUND

1. Technical Field

The present invention relates to managing the use of digital documents by users.

2. Related Art

Heretofore, digital documents (referred to hereinafter as simply documents), such as text documents, audio documents, and multimedia documents, were registered in a server and documents were provided in response to user requests.

In the management of digital document usage, the management of document usage rights (use of rights relating to the document) given to a user is important. Heretofore, the management of usage rights relating to documents is usually performed using an access control list (ACL). As is widely known, in the ACL are registered for every document (file) to be managed the rights of each user or group for the document, such as read enabled/disabled, write enabled/disabled, and so forth. If a request for an operation with respect to a document is received from a user, the management system judges, based on the ACL, whether or not the operation falls within the rights of that user and then judges whether or not to allow or prohibit the operation.

In a known system of another related art, the server encrypts documents to be provided to the user and the user acquires information for decryption from the server every time a document within the user's terminal is used. In this system, since access to the server from the user's terminal is performed at every use, the server can record the operations that were performed with respect to the document that was provided to the user.

Furthermore, in a known system or apparatus of another related art, a digital document is printed by a printer, the identification information or coordinate information listed on the printed result is associated with the digital document and stored in a document management database. Writing is performed on the printed document using a coordinate input device or electronic information input interface, such as an electronic pen, and the obtained update information of the digital document based on identification information or coordinate information is associated with the digital document and stored and updated in an operation history management database or operation history management document folder.

In one conventional system of this type, manual-based editing on a paper document is directly reflected in a digital document and a series of updated versions of digital documents is stored as a tree configuration with the digital documents as nodes.

SUMMARY

According to an aspect of the invention, there is provided a document management server for managing document use including a receiving unit that receives an access request from a client and a first ID representing a document to be an object of the access request, an ID processing unit that issues, when an operation is performed on the document in response to the access request, a second ID corresponding to the operation, and records a derivation relationship having the second ID as a child of the first ID, an attribute recording unit that records attribute information relating to the operation by association with the first ID or the second ID, and a response data provider unit that provides to the client, when the digital document is provided to the client in response to the access request, response data including attribute information associated with at least one ID appearing in a path in the derivation relationship from the received ID accompanying the access request to the root of the derived relationship.

BRIEF DESCRIPTION OF THE DRAWINGS

Exemplary embodiments of the present invention will be described in detail based on the following figures, wherein:

FIG. 4 shows one example of log data generated by a log management unit;

FIG. 8 shows one example of history information;

FIG. 9 shows another example of history information;

FIG. 12 shows an example of log data in the case where document updating is performed using a total management method;

FIG. 15 shows an example of log data in the case where document updating is performed using a differential management method;

FIG. 17 shows an example of log data for which control information has been set;

DETAILED DESCRIPTION

Overview of a System for Managing Document Use Using Duplicate Shortcuts

First, a system for managing document use using duplicate shortcuts will be described.

Figure 1:
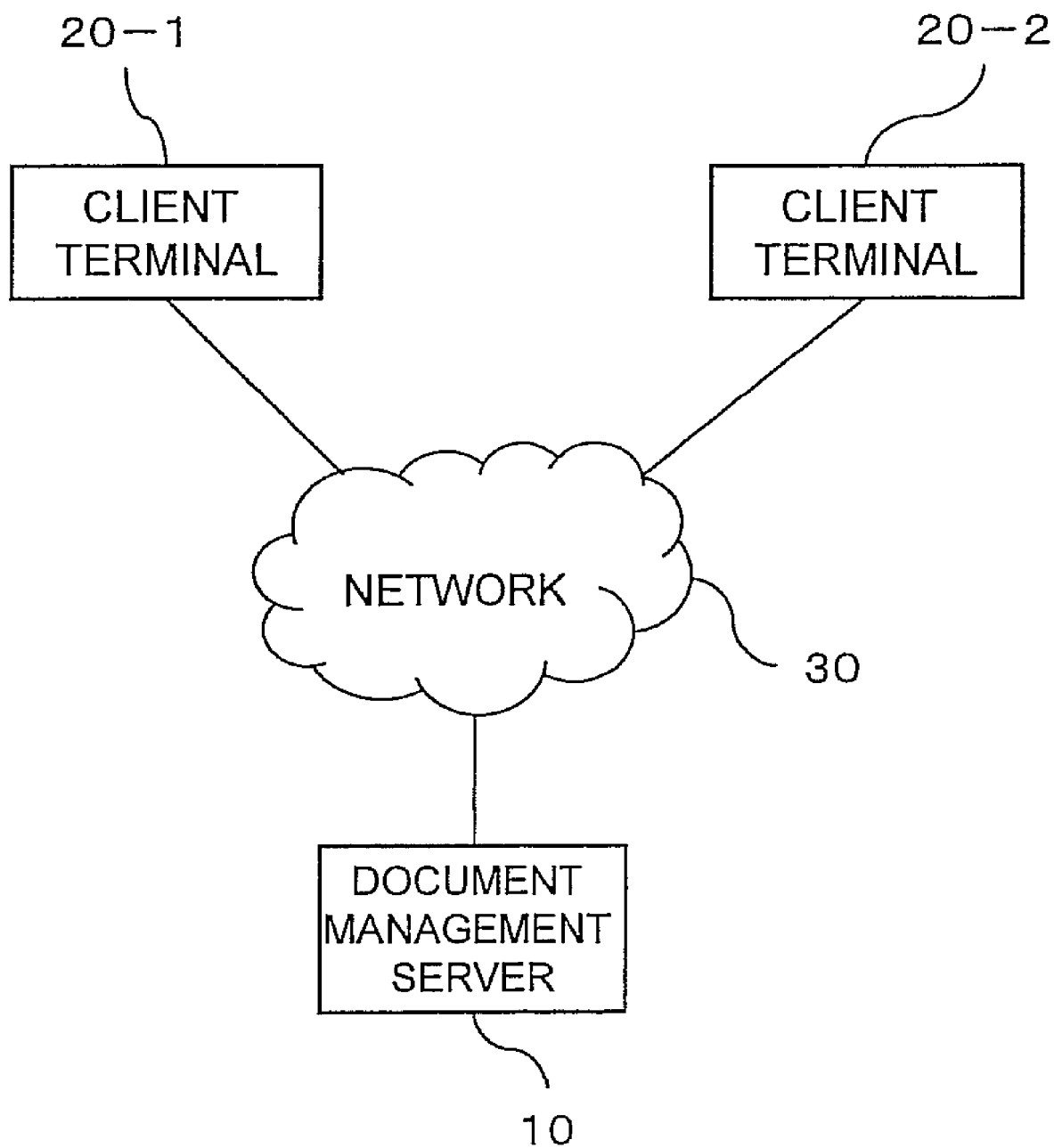
FIG. 1 is a block diagram showing a general configuration of a system for managing document use that uses duplicate shortcuts.

FIG. 1 is a block diagram showing a general configuration of a system for managing document use. This system includes a document management server 10 and client terminals 20-1, 20-2, and so forth (collectively referred to hereinafter as client terminal 20) connected via a network 30, such as the Internet or a local area network.

In this system, the original file of a digital document is managed by the document management server 10 and security of the digital document is ensured by not storing the file of the digital document in the client terminal 20. Instead of the file of the digital document itself, a file called a duplicate shortcut (referred to hereinafter as duplicate SC) that includes information for accessing the digital document is kept in the client terminal 20. The duplicate SC may include identification information for management called a duplicate ID, access information, such as a host name of the document management server 10 or an URL (Uniform Resource Locator) for the document read request, and an attribute for the duplicate SC. One example of information included in a duplicate SC: "id=1234567, host=foo.fujixerox.co.jp, createDate=2005/05/24 11:12:34"

In this example, "id=1234567" represents the duplicate ID, "host=foo.fujixerox.co.jp" represents the host name of the document management server 10, and "createDate=2005/05/24 11:12:34" represents the creation date and time, which is one attribute of the duplicate SC. To prevent data leakage, the duplicate shortcut does not include the actual digital document. However, so that the user can identify the digital document for the duplicate SC, part of the digital document, such as the information from only the first page, or a thumbnail image from each page of the digital document may be included in the duplicate SC as a low-quality sample of the digital document.

The access information that is included in the duplicate SC is used when the client terminal 20, which uses the duplicate SC, accesses the document management server 10 that manages the original corresponding to the duplicate SC. However, if a server is provided on the network (and this server address is included in the duplicate SC or known by a viewer 22) for resolving the access information for the document management server 10 that manages the corresponding original from the duplicate ID, the access information for the document management server 10 need not be included in the duplicate SC.

Figure 2:
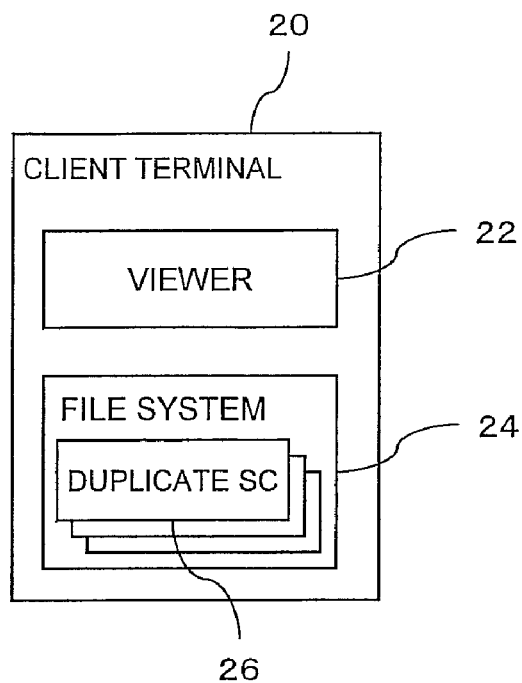
FIG. 2 shows an example of an internal configuration of a client terminal.

As shown in FIG. 2, other application files are stored together with a file for a duplicate SC 26 in a file system 24 in the client terminal 20. The duplicate SC 26 is created as a file in a format that can hold attribute information with body data of a document, such as PDF (Portable Document Format) developed by Adobe Systems Incorporated or DocuWorks (registered trademark) developed by Fuji Xerox Co., Ltd. In this case, a duplicate ID and access information are included as attribute information in the file for the duplicate SC 26. When a user desires to read or perform another operation with respect to a digital document in the document management server 10, the user selects the duplicate SC 26, similar to an ordinary shortcut file, corresponding to the digital document from a file list screen provided by the file system 24 or search software and performs the operation. Then, the viewer 22, which has been associated with the file format of the duplicate SC 26, starts, the viewer 22 access the document management server 10 using the access information and duplicate ID within the duplicate SC 26, and a duplicate document file, which is a copy of the digital document corresponding to the duplicate ID, is acquired. The viewer 22 displays the duplicate file and editing operations can be performed on the duplicate file according to operations by the user. The duplicate file includes information (such as an updated duplicate ID to be described hereinafter) indicating that the file is a duplicate and from this information the viewer 22 recognizes that the file is a duplicate. The viewer 22 does not store the duplicate file in the file system 243. The duplicate file is only opened in memory space that is managed by the viewer 22 in the client terminal 20 and is not stored in the file system 24. Acrobat (registered trademark) of Adobe Systems Incorporated, which is compatible with the PDF format, may be used as for the viewer 22. The functions (some of which have already been described and will be further described hereinafter) handled in the duplicate SC that are inherent in this system may be added to an existing viewer, such as Acrobat, in the form of plug-ins.

In this system, every time a user performs an operation with respect to an original digital document on the document management server 10 by using a duplicate SC on the client terminal 20, the document management server 10 issues a new duplicate ID for updating and updates the duplicate ID within the duplicate SC on the client terminal 20 with the new duplicate ID. In this manner, every time an operation is performed on a digital document using a duplicate SC in this system, the duplicate ID within the duplicate SC is renewed. For example, if a user X requests a duplicate file of a digital document from the document management server 10 by using a duplicate SC and then acquires and reads the duplicate file, the value of the duplicate ID within the duplicate SC located in the client terminal 20 of the user X changes before and after the read operation. Therefore, if an instance is considered where the user X attaches a copy of the duplicate SC to an e-mail and sends the e-mail to another user Y, the duplicate ID in the duplicate SC that the user Y receives will differ depending on whether it was sent before or after the read operation. If a user requests an operation on a digital document using a duplicate SC, the duplicate ID included in the duplicate SC is sent from the client terminal 20 to the document management server 10 so that the document management server 10 can recognize from the received duplicate ID that the duplicate SC, which was the basis of the request, corresponds to a step of a certain operation (such as before or after reading by the user X). Furthermore, if the duplicate ID is associated with identification information for the original digital document (referred to as the document ID) and the user ID of the user (or user ID where the duplicate ID was issued) who performed the operation causing the issuance of the duplicate ID, and stored at the document management server 10, the user operation and the document subjected to the operation can be determined from the duplicate ID so that the distribution of digital documents can be tracked in detail.

The duplicate ID represents unique identification information within the system and corresponds to each operation that a user performs with respect to a digital document. The duplicate ID may be a serial number that is incremented with each operation. However, from the viewpoint of hindering attacks based on guessing by third parties, a value generated by using a generation rule that ensures high uniqueness and is difficult to guess may be used, such as a sufficiently long random number. Furthermore, a hash value (having a sufficiently large number of digits) of attribute information that changes with the issuance of each duplicate ID, such as the generated date and time of the duplicate ID, or a hash value of a combination of fixed attribute information, such as the identification information of an original corresponding to the duplicate ID, with changing attribute information, can also be used for the duplicate ID.

Figure 3:
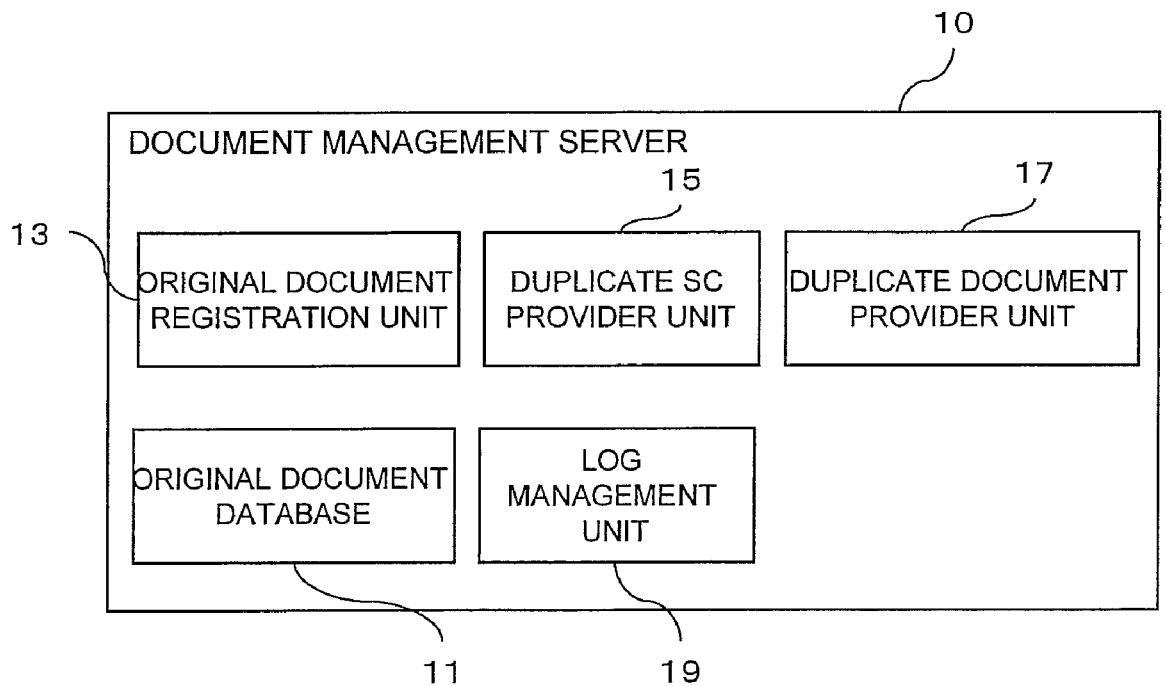
FIG. 3 shows an example of an internal configuration of a document management server.

As shown in FIG. 3, the document management server 10 includes an original document database 11, an original document registration unit 13, a duplicate SC provider unit 15, a duplicate document provider unit 17, and a log management unit 19.

The original document database 11 stores and manages digital documents as originals that have been uploaded from the client terminal 20. Within the framework of this system, only a digital document stored in the original document database 11 is handled as an original. Within this framework, even if a copy of the digital document exists on the network, it can be handled as being unrelated to the original. In particular, if the viewer 22 in the client terminal 20 does not store a duplicate document file in the file system as described hereinabove, the possibility of copies of the original being circulated on the network can be greatly reduced.

The original document registration unit 13 registers the digital document, which has been uploaded from the client terminal 20 and is to be registered as an original, into the original document database 11. At this time, the original document registration unit 13 assigns unique identification information referred to as a "document ID" to the original digital document file to be registered. The document ID may be a random number or a hash value of the document.

In response to an operation request from a user, the duplicate SC provider unit 15 issues a duplicate SC for a digital document within the original document database 11 to the user. In response to an operation request from the user, the duplicate document provider unit 17 creates and provides to the user a duplicate file of the requested digital document.

Figure 5:
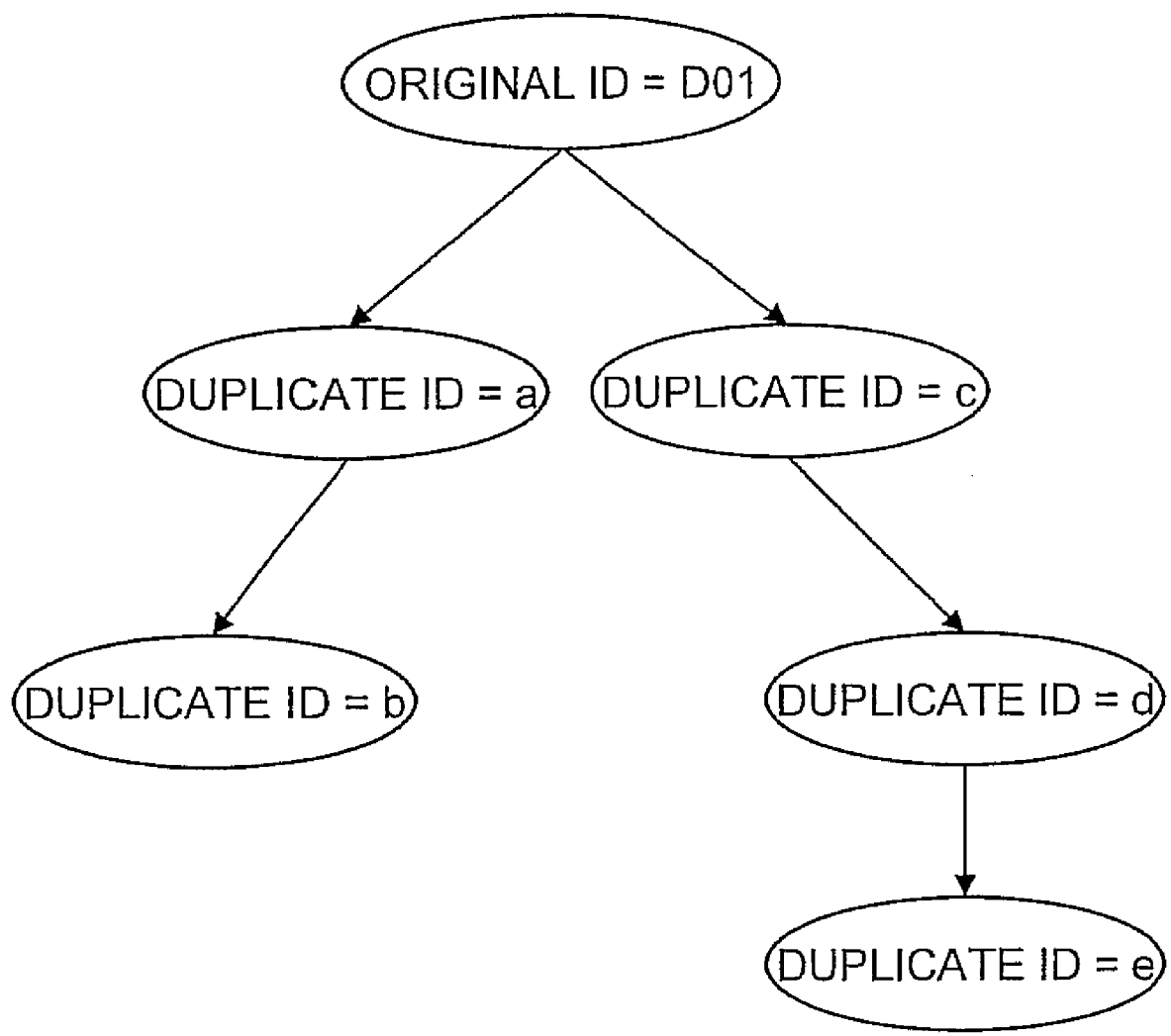
FIG. 5 shows a derivation relationship tree of the duplicate IDs shown in the log data of FIG. 4.

If the document management server 10 executes a process in response to an operation request from the user via the client terminal 20, the log management unit 19 records information relating to the operation as an event log. As shown in FIG. 4, the log management unit 19 records each operational event as a log record the document ID of the original digital document that is the target of the operation, the user ID (destination user ID) of the user (in this case, identical to the user who accessed the document management server 10 for the operation) who is provided with the duplicate ID in the operational event, the type of event, the date and time when the event occurred, the duplicate ID that is provided to the destination user in the event, and the duplicate ID (referred to as old duplicate ID) that is included in the request causing the event. According to this log record, the duplicate ID and the corresponding original document ID are associated. Furthermore, by examining the log record with respect to the duplicate ID, a new duplicate ID provided by the document management server 10 may be associated with respect to the access using the old duplicate ID for the document operation so that the change in the document ID due to an operation may be determined. This change in the duplicate ID may be represented as a relationship where the new duplicate ID is derived from the old duplicate ID due to an operation. Since the same duplicate ID is not derived from multiple different old duplicate IDs due to the uniqueness of the duplicate ID, the derivation relationship assumes a tree form. The derivation relationship of the duplicate IDs in the log data illustrated in FIG. 4 is shown in FIG. 5.

The document management server 10 may be organized using a web server and a web application. In this case, the document management server 10 provides a web page as a user interface screen to the client terminal 20.

Next, to clarify the mechanism of the system for managing document use, an operation of the system will be described with reference to FIG. 6 when the log data illustrated in FIG. 4 is formed.

First, a user P01 issues a registration request of digital document "O" 100 to the document management server 10 from a client terminal 20-P01. The digital document 100 may be within the local file system of the client terminal 20-P01 or in a file server or a document server on the network. This registration request may be performed via a user interface provided by the viewer 22. The user interface provides a directory screen showing a tree directory of a network file system or a file system, and the selection of a document to be registered is received on this directory screen from the user P01. Furthermore, the user interface may provide a search screen through which a user enters search conditions. The digital documents matching these conditions are searched from a local file system or a network file server and the search results are presented to the user from which the user may select a document to be registered. A registration request issued by the client terminal 20 includes a user ID that identifies the user P01 and the digital document 100 (body data of the document 100 or link information for the body data) to be the target. The user ID that is presented by the user P01 when logging in to the system or the client terminal 20-P01 may be used for the user ID included in the registration request.

At the document management server 10 that receives the registration request, the original document registration unit 13 acquires the body data of the digital document 100 included in the request (or acquires the body data using a link if the link to the body data is included in the request) and attaches a unique document ID "D01" to the digital document. Then, the body data of the digital document 100 is associated with the document ID "D01" and registered into the original document database 11. If the digital document 100 that is sent from the client terminal 20 is not in a document format of the system (such as PDF, for example), the document management server 10 may register the digital document 100 into the original document database 11 after converting into the document format of the system.

Next, the duplicate SC provider unit 15 generates a unique duplicate ID "a", generates a duplicate SC 102 that includes the duplicate ID "a" and the host name of the document management server 10, and transmits the duplicate SC 102 to the client terminal 20-P01, such as in a response to the registration request. Furthermore, at the document management server 10, the log management unit 19 records the second line of the table shown in FIG. 4 as a log record relating to the aforementioned registration event. In this record, the document ID of the original digital document that is the target of the operational event is "D01" and the user ID of the user who is the destination of the new duplicate ID that is generated in the operational event is "P01". Furthermore, the type of operational event is "document registration" and the date and time of the event is "2006/03/03/10:00:00". Moreover, the document ID provided to the destination user as the event result is "a" and the old duplicate ID is not included in the request of this operation in this case and is shown as NULL.

The client terminal 20-P01, which receives the duplicate SC 102 together with the response for registration success, registers the duplicate SC 102 into a file system 24-P01. At this time, the original digital document 100 within the file system 24-P01 may be deleted and a file for the duplicate SC 102 may be stored instead. If this is performed, the original body data of the digital document 100 is stored only in the document management server 10 so it becomes easy to ensure that it is the actual original.

If the user issues a request to the document management server 10 for the registration of the digital document 100 located in a file server on the network, the document management server 10 may send the duplicate SC 102 to the file server. The file server that stores the digital document 100 and receives this request may delete the digital document 100 and instead store the duplicate SC 102. In this case, the user P01 can view the duplicate SC 102 located on the file server on a directory screen of the network file system or the like.

It is assumed here that the user P01 transmits the duplicate SC 102 for the digital document "O" 100 to a user P03, such as by an attachment to an e-mail. Then, the duplicate SC 102 is stored, as a shortcut to the digital document "O", into a file system 24-P03 of a client terminal 20-P03 of the user P03. To read the digital document "O", the user P03 opens the duplicate SC 102 at the viewer 22 and enters a read command. The viewer 22 obtains the duplicate ID "a" and the host name of the document management server 10 from the duplicate SC 102, accesses the document management server 10 using the host name, and transmits a read request 104 accompanying the duplicate ID "a". This read request 104 includes the user ID of the user P03. In subsequent steps also, when the user transmits a request or other data to the document management server 10, the document management server 10 can determine which user is accessing either the ID of the user is included in the request or the user has logged into the document management server 10 prior to the transmission.

At the document management server 10 that received the read request 104, the duplicate document provider unit 17 starts. The duplicate document provider unit 17 obtains a record having the document ID "a" accompanying the read request 104 as the "provided duplicate ID", for example, from the log management unit 19, obtains the body data of the digital document "O" indicated by the document ID "D01" in the record from the original document database 11, and creates a copy of the document. Then, the duplicate document provider unit 17 creates a duplicate ID "b" for updating and sets it in the duplicate ID attribute of the file of the copy to create a duplicate file 106. The duplicate file 106 includes the copy of the original document and the duplicate ID "b". The duplicate file 106 is returned to the client terminal 20-P03 as a response to the read request 104.

Furthermore, the log management unit 19 creates and records a log record, such as the third line in the table of FIG. 4. The read request 104 includes the duplicate ID "a" and the provided duplicate file 106 accordingly includes the duplicate ID "b" so that in this log record the "old duplicate ID" is "a" and the "provided duplicate ID" is "b". Moreover, in the log record, "D01" is recorded as the target document ID, "P03" is recorded as the destination user ID, and "duplicate provided" is recorded as the event information.

The viewer 22 of the client terminal 20-P03 opens and displays the body data of the document in the received duplicate file 106. Since the duplicate file 106 is attached with a attribute indicating "save disabled", the viewer 22 does not save the duplicate file 106 into the file system 24-P03. For example, a user interface screen in which a selection to save the duplicate file 106 is not available is provided on the viewer 22. Furthermore, the viewer 22 rewrites the duplicate ID "a" in the duplicate SC 102 stored in the file system 24-P03 to the updated duplicate ID "b" which is included in the duplicate file 106 so that the shortcut to the digital document "O" is renewed. As a result, the duplicate SC 102 in the file system 24-P03 is rewritten into a duplicate SC 108 that includes the duplicate ID "b".

When considering a case where the user P03 sends the duplicate SC for the digital document "O" to another user, the duplicate SC 102 including the duplicate ID "a" is sent if the sending is prior to the reading of the duplicate file 106 by the user P03. However, if the sending is after the reading of the duplicate by the user P03, the duplicate SC 108 including the duplicate ID "b" is sent.

Next, a case will be considered where a user P04 acquires a digital document, which is managed by the document management server 10. In this case, the user P04 issues a request to the document management server 10 from a client terminal 20-P04 for a directory screen or search screen. A directory screen or search screen for selecting a digital document that is registered within the original document database 11 is generated by the document management server 10 and returned to the client terminal 20-P04. The user P04 finds the desired digital document "O" via the screens. When the user issues a command to acquire the digital document, the client terminal 20 sends an acquisition request 112 accompanying the identification information (such as document ID "D01") of the digital document "O" to the document management server 10. This is received at the document management server 10 where the duplicate SC provider unit 15 generates a new duplicate ID "c", generates a duplicate SC 114 including the new duplicate ID "c", and returns the duplicate SC 114 to the client terminal 20-P04. Then, the log management unit 19 creates a record (fourth line in the table shown in FIG. 4) regarding this event of providing the shortcut.

The client terminal 20-P04 stores the received duplicate SC 114 into a file system 24-P04. When a user selects the duplicate SC 114 and issues a read command, the viewer 22 issues a read request 116 accompanying the duplicate ID "c". In response, the document management server 10 creates a copy of the original corresponding to the duplicate ID "c", creates a duplicate ID "d" for updating and sets it to the file attribute of the copy, and creates a duplicate file 118 including the copy and the duplicate ID "d", and returns it to the client terminal 20-P04. Furthermore, the log management unit 19 records a record, such as the fifth line in the table shown in FIG. 4.

The viewer 22 of the client terminal 20-P04 opens and displays the duplicate file 118 and changes the duplicate ID of the duplicate SC 114 within the file system 24-P04 to the duplicate ID "d" for updating which is included in the duplicate file 118. As a result, the shortcut corresponding to the digital document "O" held by the client terminal 20-P04 becomes a duplicate SC 120.

After the user P04 reads the duplicate of the digital document "O", the duplicate SC 120 is transmitted to a user P08. When the user P08 uses the duplicate SC 120 to issue a read request 122, the document management server 10 provides a duplicate file 124 including a duplicate ID "e" for updating to the client terminal 20-P08 and records a log record shown as the sixth line in the table of FIG. 4. The viewer 22 of the client terminal 20-P08 opens and provides the received duplicate file 124 to the user and changes the duplicate ID of the duplicate SC within the file system 24-P08 to the duplicate ID "e".

The destination user ID for the duplicate ID in the operational event was recorded in the log data illustrated in FIG. 4. Additionally, however, the user ID that issued the request causing the event may also be recorded. In the aforementioned example, the user who issued the request causing the event and the destination of the duplicate ID that was newly generated in the event were identical. However, if they are different, it is preferable to record both user IDs as described hereinabove.

The configuration and processing of the system for managing document use to be the basis for the embodiment were detailed hereinabove. A summary of the features of this system:

- An original of the digital document is registered in the document management server.
- A duplicate SC is provided to the user instead of body data of the digital document. The duplicate SC includes a duplicate ID. When an operation relating to the original is performed on the document management server 10 using the duplicate SC, it is necessary to identify the document management server 10 that manages the original. Thus, the duplicate SC may include information for identifying the document management server 10 that manages the corresponding original.
- The document management server manages a correspondence relationship between the duplicate ID of the provided duplicate SC and the corresponding original. (In the aforementioned example, the correspondence relationship between the duplicate ID and the original was managed in a form by being included in the log record of the log management unit 19. The correspondence relationship data may have any form provided the correspondence between both is clear.)
- When performing an operation with respect to a document on the document management server, the duplicate ID of the duplicate SC held by the terminal performing the operation is sent to the server.
- The document management server identifies the original corresponding to the duplicate ID received from the terminal on the basis of the correspondence relationship between the duplicate ID and the original and performs the requested operation relating to the original.
- When an operation relating to the original is performed, the document management server creates a new duplicate ID and sends this duplicate ID to the client terminal that requested the operation. The client terminal that receives this updates the duplicate ID of the duplicate SC used in the request to the received new duplicate ID.
- The document management server manages the duplicate ID derivation relationship, which is a correspondence relationship between the duplicate ID that is included in the request from the client terminal and the new duplicate ID that is generated by performing an operation relating to the request.
- When a request for an operation which requires body data of the digital document, such as reading of the digital document, is issued from the client terminal the document management server provides duplicate document data which is a copy of the original to the terminal. The duplicate document data exists only in a region of memory managed by the viewer that operates on the client terminal and is set so that it cannot be stored on disks.

In the aforementioned example, the log record illustrated in FIG. 4 was recorded by the document management server 10. However, this is only one example. For example, in addition or in replacement of the destination user ID, the user name of the destination user may be recorded. The user name may be obtained from the client terminal 20. Furthermore, the name of the organization to which the destination user belongs to may be recorded. The name of the organization to which the user belongs to may be the name of the business or department and may be obtained from an organization information management database that is connected to the present system. The organization information management database is a type of directory server for managing the name of each member of the organization, department, position, contact information, and so forth. In a business system, having this sort of organization information management database is common so that the information can be acquired from the database. Furthermore, for the user name and the organization name, the distinguished name (DN) of the ITU-T recommendation X.509 certification standard may be used. The DN may be acquired from an LDAP (Lightweight Directory Access Protocol) server. Furthermore, the IP (Internet Protocol) address or the MAC (Media Access Control) address of the client terminal 20 that is used by the destination user my be recorded into the log record. The IP address or MAC address can be obtained during access from the client terminal 20.

Furthermore, such operations as document registration, acquisition of the duplicate SC, and document reading were illustrated in the aforementioned example of the system for managing document use. However, besides these operations, all system operations among those relating to the original document can be applied to the aforementioned characteristic processing.

Provision of History Information

In the aforementioned system, the operation history for a digital document can be provided to the user reading the document.

Figure 6:
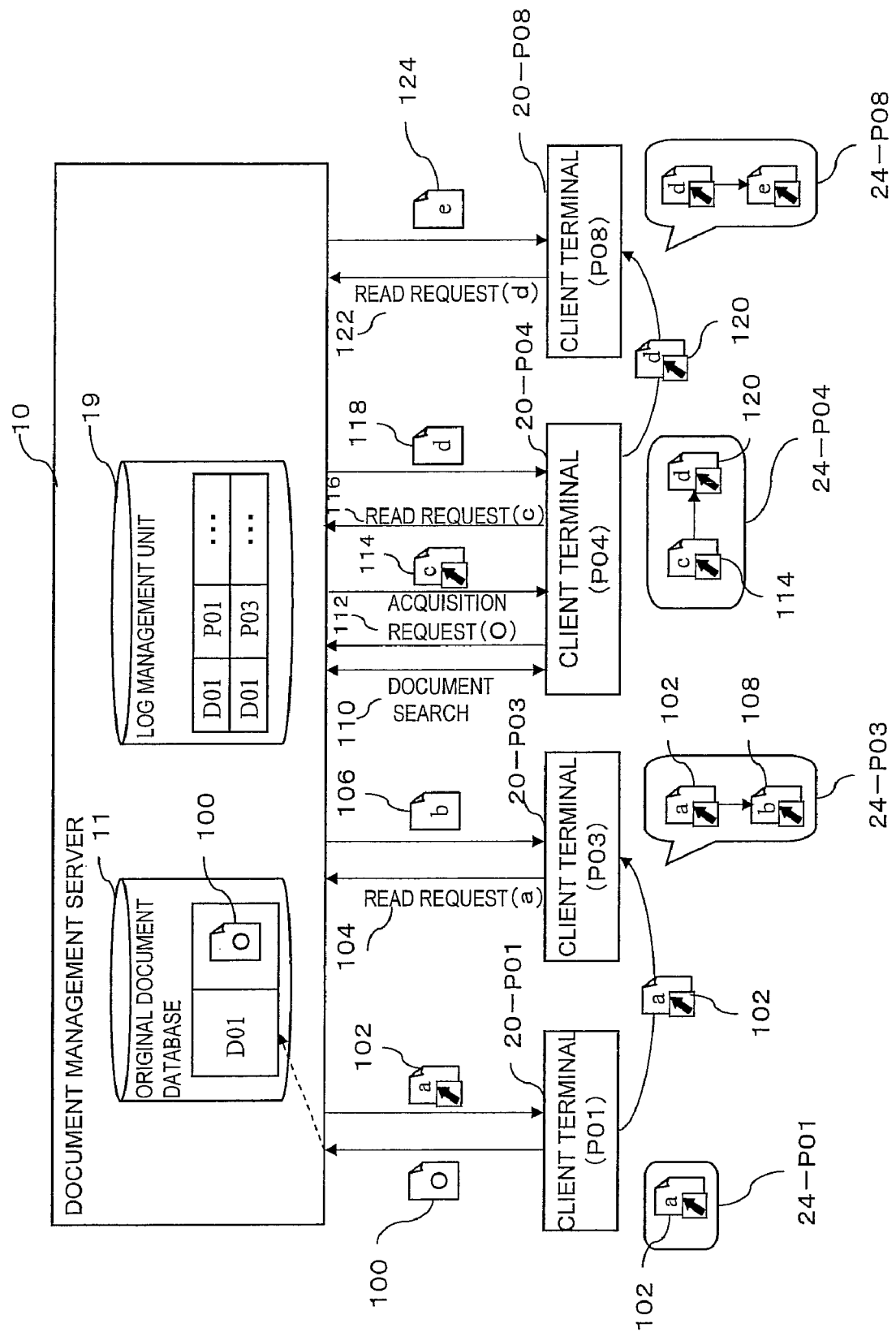
FIG. 6 illustrates a system operation in the case where the log data of FIG. 4 is generated.

For example, the flow of reading a digital document shown in FIG. 4 to FIG. 6 will be illustrated. In this case, user P03 and user P08 read the digital document corresponding to the same original D01 that the user P01 has registered. However, their acquisition paths of the digital document differ. Namely, the digital document read by user P03 was received from user P01 while the digital document read by user P08 was received from user P04. In some cases, the operation history until the acquisition may be convenient for the user. A mechanism for this will be described hereinafter.

Figure 7:
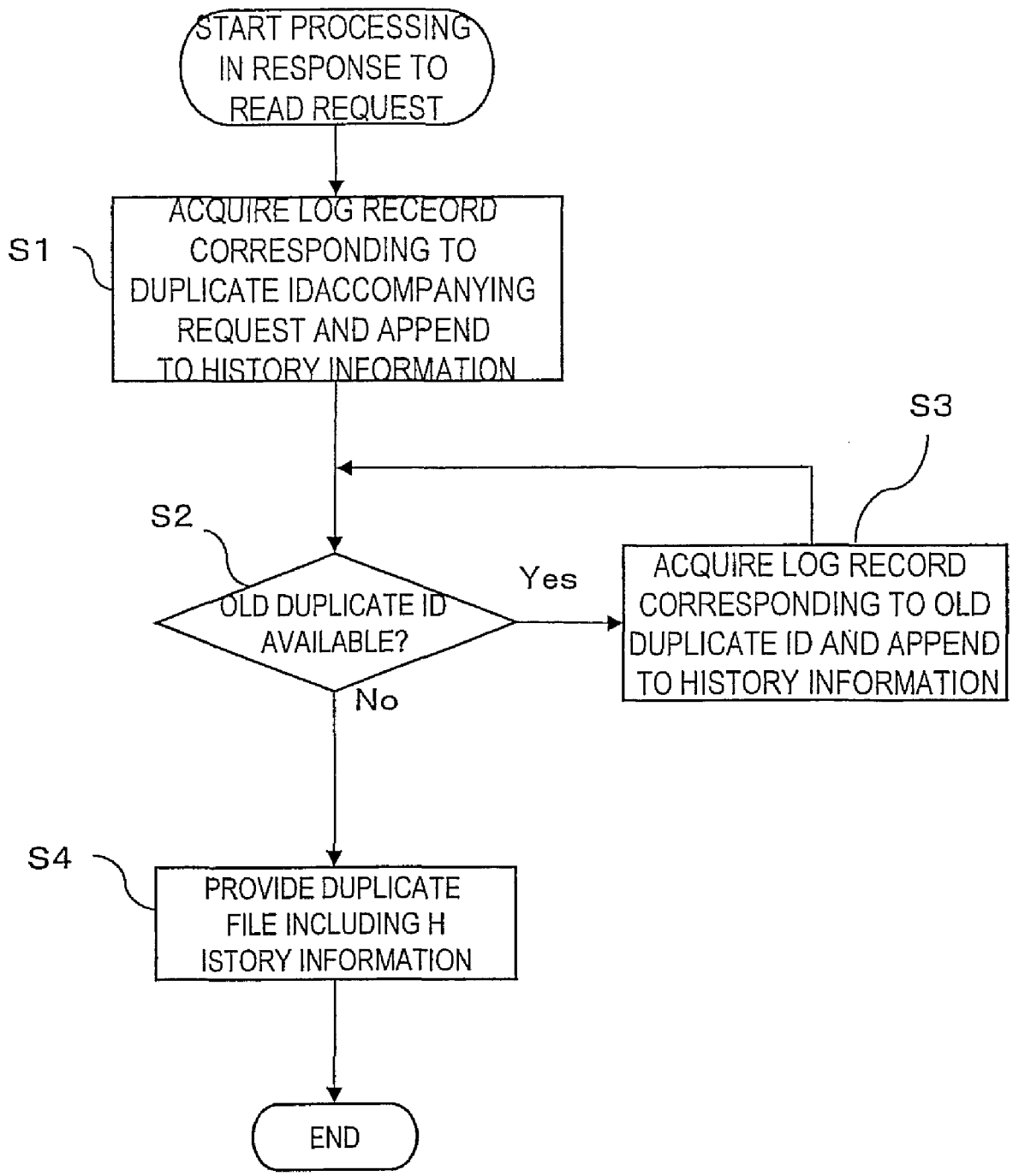
FIG. 7 is a flowchart showing one example of a procedure for providing history information.

In this example, the document management server 10 executes a process, such as shown in FIG. 7, when a read request is received from the client terminal 20.

Namely, the document management server 10 first searches the log management unit 19 for the log record having the duplicate ID that is sent accompanying the read request as the value of the "provided duplicate ID". Then, from the items in the log record, the values of the items to be provided to the user are extracted and the information of the extracted items is appended (S1) to the end of the operation history buffer (not shown). The operation history buffer is a temporary storage region that has been prepared for organizing the operation history to be provided to the user. The items in the log record to be provided to the user may be pre-registered, such as by a system administrator, in the document management server 10.

Next, the document management server 10 checks (S2) whether or not a value for the "old duplicate ID" is found in the log record that was acquired in step S1. If an old duplicate ID is found, a search is made for a log record having the old duplicate ID as the value of the "provided duplicate ID" from the log management unit 19, and the values of the items to be provided from the searched log record are extracted and appended (S3) to the operation history buffer. Then, the process returns to step S2 where it is judged whether or not the old duplicate ID exists in the log record obtained in step S3.

The aforementioned processing is repeated until the judgment result of step S2 is "no". The judgment result of step S3 becomes "no" when the value of the "old duplicate ID" in the log record obtained in step S1 or S3 is null and this signifies that the highest level (that is "the root" of the tree which represent the derivation relationship) has been reached in the derivation relationship (such as in FIG. 5) of the duplicate IDs. When the highest level of the derivation relationship is reached in this manner, a copy of the original digital document (namely, a duplicate file) that is the object of the read request is created, and the operation history that has been stored in the operation history buffer until that time is included as attribute information in the duplicate file and transmitted (S4) to the client terminal 20 of the user originating the read request.

Although not shown in the accompanying drawings, there is the case where the "event" of the log record of the highest duplicate ID is not "document registration". In such a case, a search may be made for a log record of a "document registration" event having the document ID of the requested digital document from the log management unit 19 and appended to the operation history. Furthermore, when the document management server 10 provides the duplicate file to the user in response to the read request, the information on the log record of the duplicate provision event may be appended to the operation history and provided.

According to the aforementioned process, such as the flow of FIG. 6, the operation history shown in FIG. 8 is included in the duplicate file 106 provided by the document management server 10 in response to the read request 104 of the user P03. The operation history is created from the log data of FIG. 4. This operation history shows that the user P03 directly acquired from the user P01 and read the document, which was registered by the user P01. From the viewpoint of the server, this operation means "duplicate provision". On the other hand, the operation history shown in FIG. 9 is included in response to the read request 122 of the user P08. This operation history shows that the digital document currently being read by user P08 was registered into the document management server 10 by user P01 and read by user P04 and then transferred to user P08 from user P04. The items shown in FIG. 8 and FIG. 9 are only one example. Provided the items are recorded in the log record, any of the items may be included in the operation history.

In the system described hereinabove, when the user requests to read a document using the duplicate SC, the history of operations appearing while traversing the tree of the derivation relationship of the duplicate IDs from the duplicate ID of the duplicate SC until the root node (referred to hereinafter as "root") is provided to the user. Described in another way, in the system, any operation history not appearing in a path traversing the derivation relationship from the duplicate ID in the duplicate SC until the root is not provided to the user so that any information unrelated to the distribution path of the duplicate SC, which is used for the read request by the user, is not disclosed to the user.

An example was given hereinabove where operation history is included in the duplicate file provided to the user corresponding to the read request. Besides this, a command may be prepared for obtaining the operation history for a duplicate SC received by a user. In this case, an operation history acquisition command may be provided as an option when opening a duplicate SC. When the user selects this command, the document management server 10 generates and provides (to the user) operation history information that includes the history of each step until the root of the derivation relationship from the duplicate ID that is included in the duplicate SC.

Furthermore, a derivative duplicate ID may be obtained through a predetermined procedure for the duplicate ID that is received accompanying the read request, and the aforementioned process may be executed using the derivative duplicate ID as the duplicate ID that is received accompanying the read request.

As a procedure for obtaining the derivative duplicate ID, a method exists for selecting, as a derivative duplicate ID, the last duplicate ID that was issued among descendent duplicate IDs of the duplicate ID that is received accompanying the read request. Furthermore, another method exists for selecting, as a derivative duplicate ID, a duplicate ID, for which attribute information recorded in association with the duplicate ID, satisfies a predetermined condition among the duplicate IDs positioned as descendents of the duplicate ID that is received accompanying the read request. For example, attribute information called "version information" recorded in association with the duplicate ID matching character string "final version" is selected as the derivative duplicate ID from among the duplicate IDs positioned as descendents of the received duplicate ID accompanying the read request.

Access Management for Derivative Documents

Next, an instance is considered where a digital document, which has been registered in the document management server 10, has its contents updated while being distributed from user to user. The registered digital document may be distributed by branching into multiple paths with a separate update being performed in each path. As one distribution form for a digital document, a method can be considered where an update is added to the digital document and that update only influences the distribution paths for the digital document that are downstream from the update. A mechanism for implementing this updating method using the duplicate SC will be described hereinafter.

Figure 10:
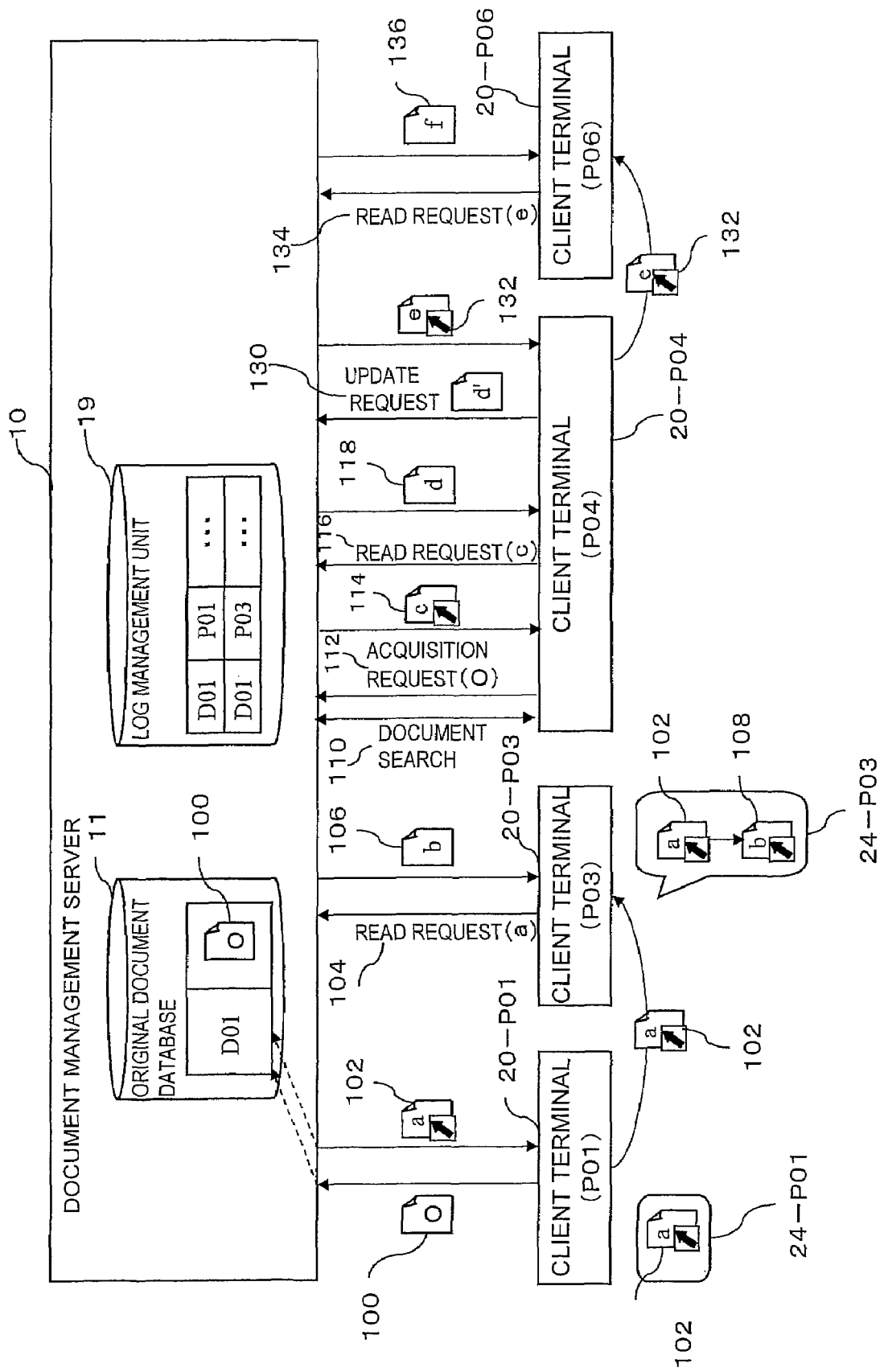
FIG. 10 illustrates a system operation including document updating.

Specifically, a document flow shown in FIG. 10 will be considered. This example is identical to the flow shown in FIG. 6 (and FIG. 4) until the step where user P04 acquires the duplicate file 118. Here, the user P04 opens the acquired duplicate file 118 and adds an update to the document content of the duplicate file 118 by using a document editing function that is provided by the viewer 22. When the user P04 selects an operation for registering the update into the document management server 10 through the operation menu of the viewer 22, the viewer 22 transmits an update request 130 that includes the updated document (namely, the updated version) and the duplicate ID "d" to the document management server 10. In response to this update request 130, the document management server 10 records the document update.

Figure 11:
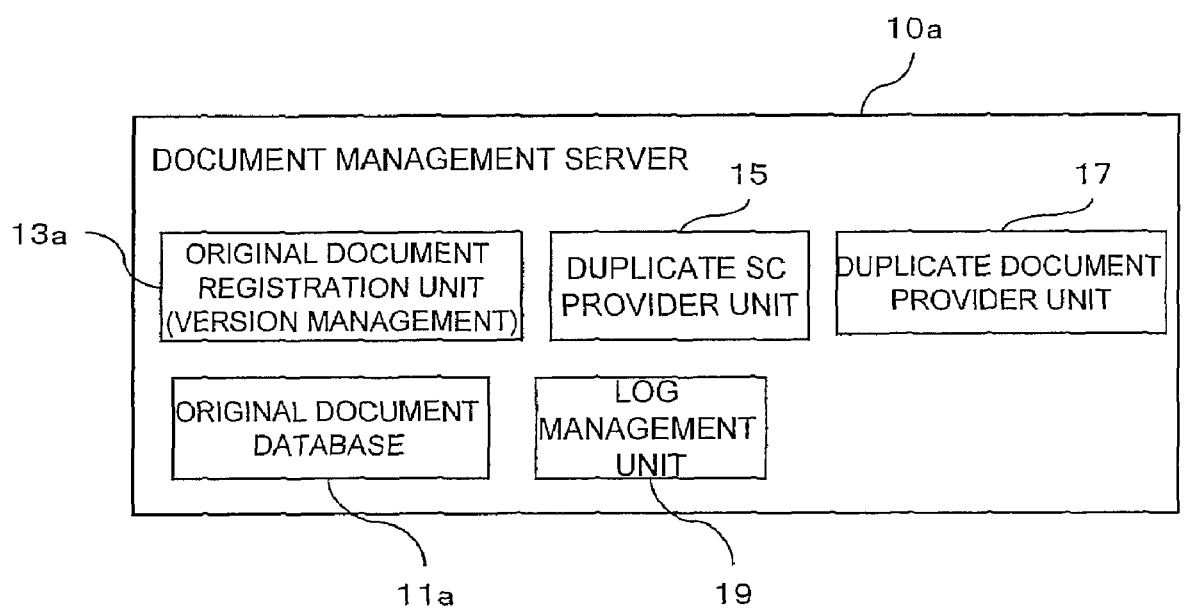
FIG. 11 shows an example of an internal configuration of the document management server for processing document updating using a total management method.

The recording of the document update can be performed, for example, by accumulating document data for the update version that is included in the update request 130 while performing version management. Namely, as shown in FIG. 11, an original document registration unit 13*a* of a document management server 10*a* in this case includes a version management function so that when a document registration request or an update request is received, a version number is assigned to the document data accompanying the request and registered into an original database 11*a*. The document data registered at this time is managed by being associated with the same document ID as the original. The assigned version number may be a number that does not conflict with the document data that has already been registered in association with the same document ID within the original database 11*a*.

When the update is recorded in this manner, the document management server 10 generates a duplicate SC 132 that includes a new duplicate ID "e" and returns it to the client terminal 20-P04 of user P04. Then, a log record of the update process is generated and registered into the log management unit 19.

In the example of FIG. 10, the user P04 provides the duplicate SC 132 to a user P06. When user P06 issues a read request 134 using the duplicate SC 132 through the client terminal 20-P06, the document management server 10 generates a duplicate file 136 (duplicate ID "f") that includes document data for the updated version from the update request 130 and returns it to user P06.

An example of the log data recorded in the aforementioned flow is shown in FIG. 12. Methods for managing updates of the document body include holding the complete data of the document after each update (hereinafter referred to as "overall management method") and holding only the difference after the update (hereinafter referred to as "differential management method"). In the differential management method, the differences in the order the updates were performed for the original document are applied to yield the newest document. An example of managing document updates using the overall management method will be first described hereinafter.

In this example, a "document version" is included as one item of the log record. At a document registration event in response to the document registration request 100 (refer to FIG. 10), the original document registration unit 13a assigns a version number ("0" in this example) to the document data to be registered and records this version number into the log record. The log record recorded at this time is the record in the second line of the table of FIG. 12 and is the same as the record in the second line of the table of FIG. 4 except for the addition of the document version. This is also the same for the case of updates. Furthermore, at the update event in response to the update request 130 (refer to FIG. 10), the document management server 10 assigns a new version number of "1" to the document data of the updated version and creates and records into the log management unit 19 the log record of the sixth line in the table of FIG. 12.

Moreover, although not shown in FIG. 10, the user P04 provides the duplicate SC 132 (duplicate ID "e") to user P08 in the example of FIG. 12 and the user P08 updates the document using the duplicate SC 132. The log record at this update is the record of the ninth line (second line from the bottom) in FIG. 12. Thereafter, in the example of FIG. 12, the user P08 provides the duplicate SC (duplicate ID "h"), which has the updated result, to a user P11 and the user P11 reads the updated document using the duplicate SC.

Figure 13:
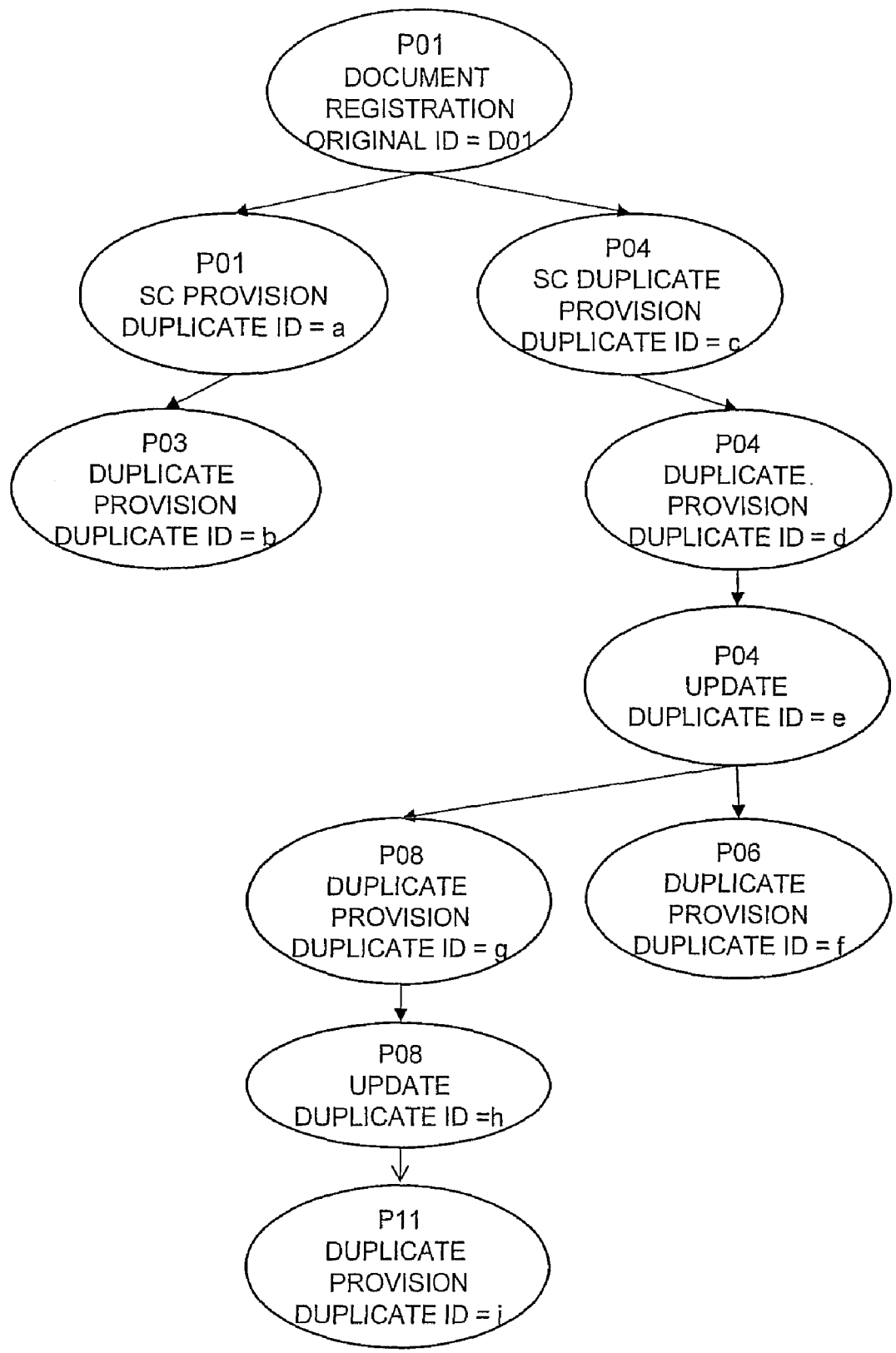
FIG. 13 shows a derivation relationship tree of duplicate IDs corresponding to the log data of FIG. 12.

FIG. 13 shows a derivation relationship tree of the duplicate IDs corresponding to the log data of FIG. 12. This tree may be created by using the correspondence relationship between the "provided duplicate ID" and the "old duplicate ID" in each log record, and the document ID information. So that the correspondence relationship between the duplicate ID and the operation event is easy to understand, the tree in FIG. 13 shows the ID of the destination user (in other words, the user who requested the operation event) of the duplicate ID generated in the operation event, the type of operation event, and the duplicate ID (or document ID of the original).

Figure 14:
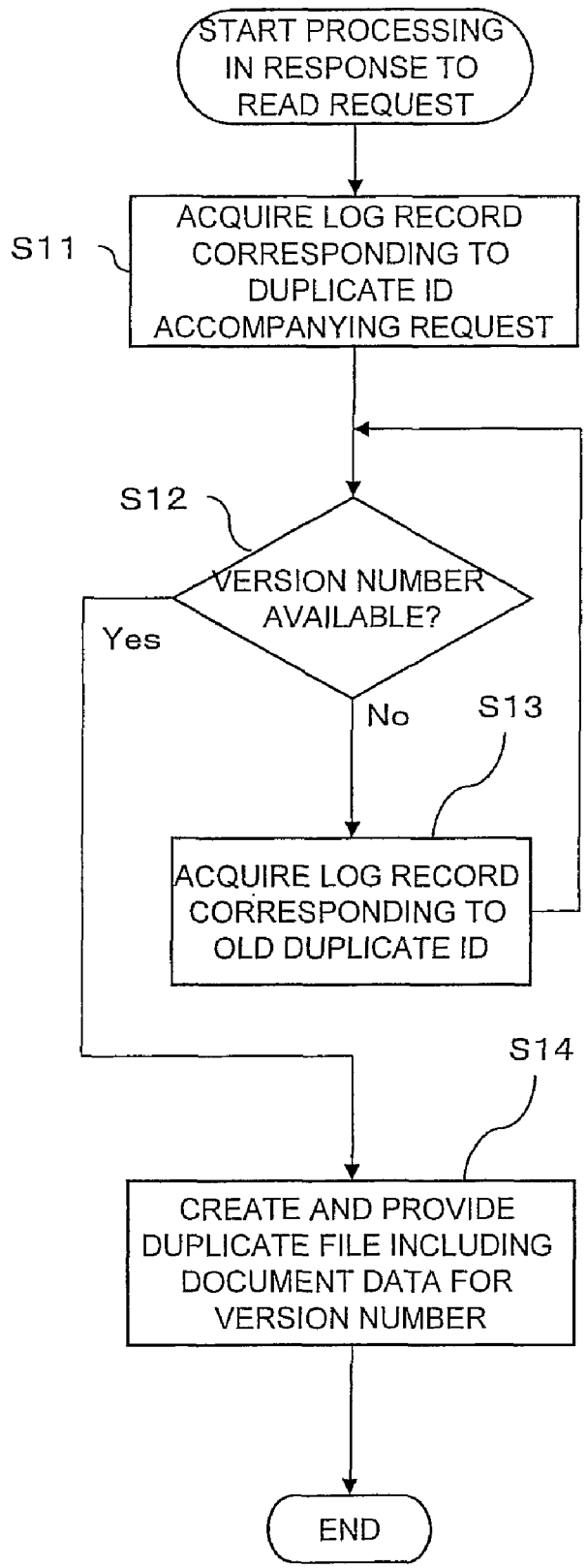
FIG. 14 shows one example of a procedure for the document management server upon arrival of a read request in an example employing the total management method.

Next, the procedure of the document management server 10 will be described with reference to FIG. 14 when a read request is received from the client terminal 20 in the case where document updates are managed using the overall management method.

In this procedure, when a read request is received from a user, the document management server 10 acquires (S11) the log record with the duplicate ID accompanying the read request having the value of "provided duplicate ID" from the log management unit 19. Then, it is judged (S12) whether or not a version number has been registered in the item for "document version" in the log record. If a version number is not included, the log record having the value of the "old duplicate ID" in the log record as the value of the "provided duplicate ID" is acquired (S13) and it is judged whether or not a version number has been registered in the item for "document version" in the acquired log record.

On the other hand, if it is judged in step S12 that a version number has been registered in the log record, the document management server 10 extracts document data identified by the combination of document ID and version number in the log record from the original database 11a and creates a duplicate file that includes the document data and provides (S14) it to the requesting user.

According to the aforementioned procedure, with the duplicate ID in the duplicate SC that is used in the read request as the origin, in the process tracing the derivation relationship tree from the origin to the root, the first document data corresponding to the version number that is found is provided to the requesting user.

For example, in the example of FIG. 10, when the user P06 issues the read request 134, the document management server 10 acquires the record of the sixth line in the table of FIG. 12 as the log record having the duplicate ID "e" accompanying the read request 134 as the value of the "provided duplicate ID". The record includes version number "1" so that the document management server 10 reads the document data corresponding to the combination of document ID "D01" and version number "1" from the original database 11a and provides a duplicate file that includes this document data to the user P06.

Furthermore, in the example shown in FIG. 12 and FIG. 13, when the user P11 issues a read request by using the duplicate SC (duplicate ID "h") acquired from the user P08, a duplicate file that includes the document data identified by document ID "D01" and version number "2" is provided by the same process. Simultaneously, in response to the read request 104 by user P03, a duplicate file that includes document data identified by document ID "D01" and version number "0" is provided.

In this system, the derivation relationship of the duplicate IDs represents the flow of digital document delivery between users, namely, the information along the distribution paths. Therefore, in this system, even if the digital document is distributed by branching into multiple paths, a duplicate file that includes the document data for the newest version is provided in the path from the root to the duplicate ID in response to the read request that used the duplicate ID.

Although updating of the content of the digital document was managed with the overall management method in the aforementioned example, this is only one example. As another example, the difference in document content before and after an update may be stored into the document management server 10. The difference can be created from a program for creating differences, such a program corresponding to the "diff" command in the UNIX (registered trademark) operating system. The differential data may be created by the viewer 22, which performed the document editing tasks, and may be sent together with the update request to the document management server 10. Furthermore, instead of this, the viewer 22 may send the updated document data itself to the document management server 10 and the document management server 10 may create the differential data. In any case, the document management server 10 assigns an identification number to the differential data and stores it to a storage device, such as the original database 11.

In this method for managing the differences (hereinafter referred to as the "differential management method"), when the document management server 10 updates the digital document, log data that includes the identifier (differential ID) of the differential data is generated as shown in FIG. 15. The log data of FIG. 15 is an example of the case where the log data of FIG. 12 for the overall management method is used in the differential management method.

Figure 16:
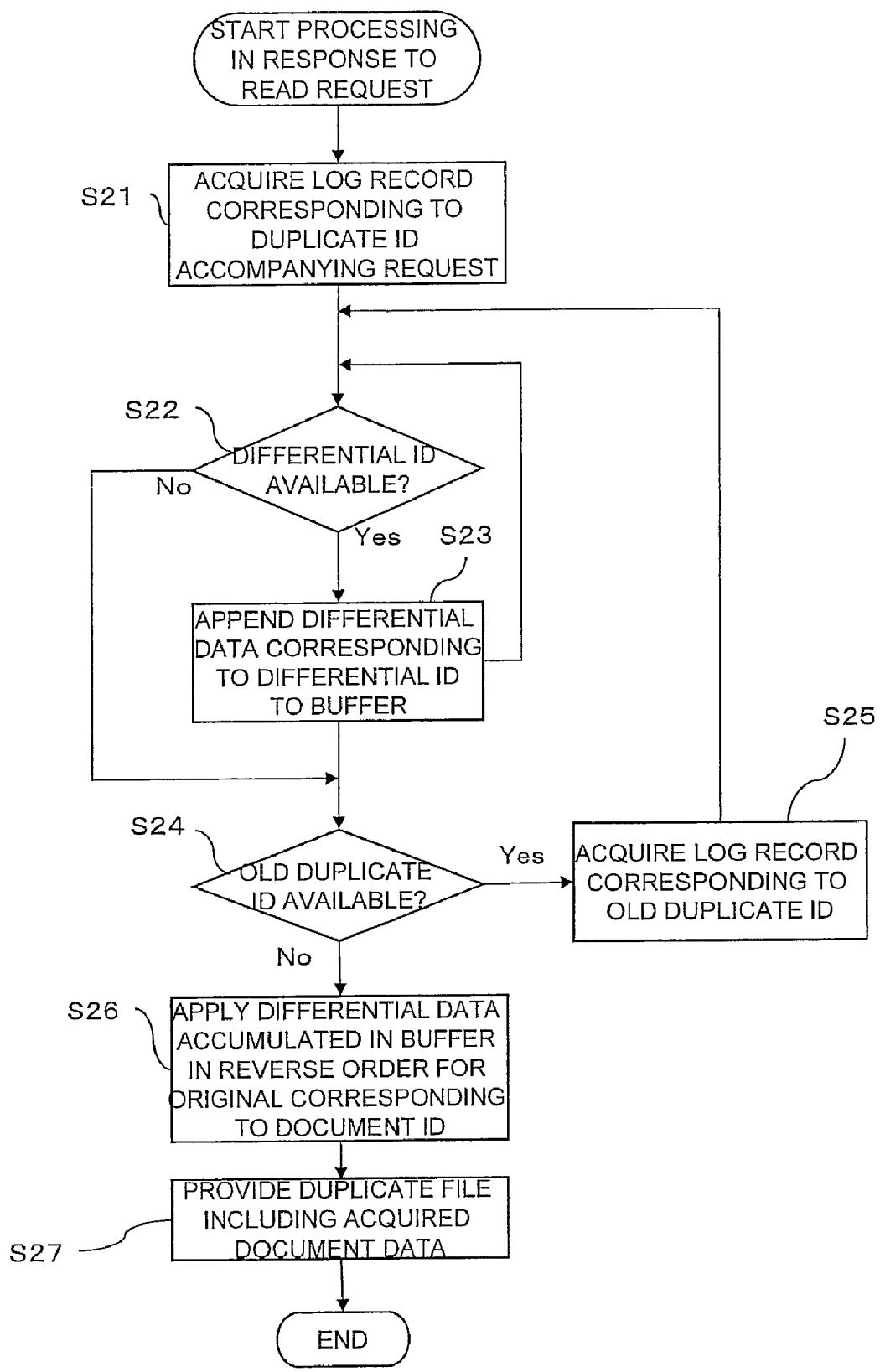
FIG. 16 shows one example of a procedure for the document management server upon arrival of a read request in an example employing the differential management method.

One example of a procedure in the system for the differential management method is shown in FIG. 16 for the case where the document management server 10 receives a read request from a user.

In this procedure, when a read request is received from a user, the document management server 10 acquires (S21) the log record with the duplicate ID accompanying the read request having the value of "provided duplicate ID" from the log management unit 19. Then, it is judged (S22) whether or not a value has been registered in the item for "differential ID" in the log record. If a differential ID has been registered, the differential data corresponding to the differential ID is acquired from the storage device and appended (S23) to a buffer for differential data storage. Then, it is judged (S24) whether or not a value has been registered in the log record for "old duplicate ID". If a value has been registered, the log record having the duplicate ID as the value of "provided duplicate ID" is acquired (S25) from the log management unit 19 and the execution returns to step S22. In step S22, it is judged whether or not the log record that was acquired in step S25 includes the differential ID. The aforementioned procedure is repeated until it is judged at step S24 that an old duplicate ID has not been registered in the log record.

If it was judged in step S24 that an old duplicate ID has not been registered in the log record, this signifies that the root in the derivation relationship tree for the digital document has been reached. At this time, the differential data items for the updates that have been added to the original digital document are arranged in reverse sequence of the updates in the buffer for differential data storage. The document management server 10 acquires the original document data corresponding to the document ID in the log record from the original database 11 and applies (S26) the differential data items that have accumulated in the buffer for differential data storage in reverse sequence of the updates, namely, in chronological sequence of the updates. Then, the resulting document data is integrated into the duplicate file and provided to the requesting user (S27).

The differential management method can provide a duplicate file that reflects all the updates in the path from the root to the duplicate ID for the read request using the duplicate ID.

A case where updates are added to a digital document body was described hereinabove. However, updates to a digital document may assume other modes, such as adding other additional data to the digital document body or attaching a document attachment to the digital document body. An example of additional data is tag data (annotation data) that may be added to an arbitrary position on an arbitrary page of a digital document. This sort of additional data or document attachment can be handled in the same manner as the differential data. Namely, the additional data and document attachment may be appended with identification information and stored into the storage device within the document management server 10 and the identification information may be recorded into the log record of the append operation for the data. In the case for tag data, not only the content of the tag but also information on the position where it is to be applied is recorded. Then, if there is a read request, with the duplicate ID accompanying the request as the origin, the derivation relationship tree is traced from the origin to the root, the additional data or document attachment that was recorded to each node (or log record) on the retroactive path is provided to the user together with a copy of the original. In the case for tags, a file is created and provided by positioning all tags on the copy of the original. In one operation event, both additional data and a document attachment may be added to the digital document and the addition of additional data or document attachment may be executed simultaneously with the updating of the digital document body.

A mechanism for controlling the use of digital document by users using the derivation relationship of the duplicate IDs will be described next.

The control of the use of digital documents includes read control and document update control. In the example hereinafter, control information can be set for the node (or each log record) of the derivation relationship tree and control is performed for reading and document updating on the basis of the control information.

Settable control information includes the following.

(1) Access Time Limit

This control information can be set to the node where the event type is "document update" in the derivation relationship tree (namely, the log record where the event type is "document update" in the log data) and specifies the time limit for access to the update information at the node.

This control information can be set by the user who performed the update in the document update event. Furthermore, it is also possible to allow the user who performed the update or a privileged user, such as a system administrator, to set the control information after the document update.

To set the control information after the document update, the user who performed the update may use the duplicate SC that is received as a result of the update event. Namely, in this case, an operation item for setting the control information may be provided in the operation option of the duplicate SC, and when this operation item is selected as the duplicate SC is opened, the viewer 22 provides a user interface for setting control information. Control information that is input using this user interface may be transmitted to the document management server 10 together with the duplicate ID of the duplicate SC. The document management server 10 writes the received control information to the control information field in the log record having the duplicate ID, which was received accompanying the control information, as the value of "provided duplicate ID". To prevent a general user other than the one who performed the update from setting the control information, the document management server 10 may perform user authentication when a request to set control information is received.

A privileged user, such as a system administrator, may set the control information by using the same duplicate SC as in the case of the user who performed the update. Furthermore, it is possible so that the control information is set by accessing the node only through an interface that is allowed to privileged users. In this case, the document management server 10 performs user authentication for the user attempting to use the interface and judges whether or not the user is a privileged user.

The value of the access time limit can be specified in the form of year-month-day-time. The update information held by the node for which an access time limit has been set (namely, document data of the version recorded in the log record corresponding to the node, or differential data, additional data or document attachment) cannot be read after the access time limit expires.

In a system recording the document update using the overall management method, when the access time limit that has been set for a node expires, the document data of the version held by the node and the document data of the version held by a downstream (descendent) node in the derivation relationship tree cannot be read. Furthermore, when the access time limit that has been set at a node expires, it is possible to completely prevent read requests that use the duplicate IDs of downstream nodes from being accepted.

In a system recording the document update using the differential management method (including methods for adding additional data or document attachment), when the access time limit that has been set for a node expires, the differential data, additional data, and document attachment held by that node cannot be read. On the other hand, it is possible to set the read access to the differential data, additional data, and document attachment held by an upstream or downstream node so as to be unaffected by the access time limit. Or, it is possible to set the differential data, additional data, and document attachment held by a node, which has been set with a time limit, and by each downstream node to be unreadable.

In yet another example, it is possible to set the differential data, additional data, and document attachment held by a node, whose access time limit has been expired, and by each upstream and downstream node to be unreadable. In this case, if a duplicate SC holding a duplicate ID of a node, whose access time limit has been expired, or descendent nodes is used, no update information can be read and only the original can be read.

(2) Number of Accesses

This control information can be set to a node (namely, log record), for which the event type is "document update" in the derivation relationship tree, and specify the maximum number of accesses to the update information at the node. At the document update event, this control information may be set by the user who performed the update. Furthermore, it is possible to allow the user who performed the update or a privileged user, such as a system administrator, to set the control information after the document update. The same method for the access time limit may be used for the user who performed the update or a privileged user to set the control information.

The update information held by the node for which the number of accesses has been set cannot be read after the number of read operations reaches the number of accesses. The value of the number of accesses may be set per user or as a total number among all users, and the use of either may be determined by the system administrator.

The restriction on reading in the overall management method and the differential management method when the set number of accesses is reached may be implemented in the same manner as when the access time limit is reached.

(3) Update and Append Disable

This control information can be set to an arbitrary node in the derivation relationship tree. If this control information has been set to a node and a user opens a digital document using a duplicate SC from that node (namely, a duplicate ID at a descendent node in the tree), this inhibits any update and append operations to the digital document. The update and append operations include updating the document content, appending additional data, and attaching a document, and the disabling may be set individually for each item.

This control information may be set by a privileged user, such as a system administrator, or a user who has been pre-registered into the system and has the right to set the update and append disable restrictions. When a command to set this control information is received from a user, the document management server 10 judges whether the user has the right to perform the setting and then sets the control information only if the user does have the right.

When a user issues a read request for a digital document to the document management server 10 by using a duplicate SC, the document management server 10 checks by tracing the derivation relationship tree from the duplicate ID of the duplicate SC to the root as to whether there is any node that has been set with control information to disable the update and append operations. If such a node is found, an attribute to disable the update and append operations is set for the duplicate file that is provided to the user. If the attribute to disable the update and append operations has been set, the viewer 22 that opens the duplicate file may be set so as not to accept update and append inputs for a document.

Furthermore, instead of setting the attribute to disable the update and append operations to the duplicate file to be provided, when an update information is uploaded from the viewer 22, the document management server 10 may be set to stop the update of a digital document according to the update information if there is a node that has been set with control information to disable the update and append operations along the derivation relationship tree from the duplicate ID accompanying the update information to the root.

(4) Access Restriction

This control information can be set to an arbitrary node in the derivation relationship tree and specifies the restriction on access to a digital document that uses a descendent duplicate SC of a node that has been set with this control information. The types of access restriction may include a complete read disable restriction and a conditional read restriction. The conditional read restriction may permit reading only from a particular subnet or only by a user having a particular position. In the former case, a parameter of the access restriction specifies information, such as an address range showing the particular subnet. Furthermore, the "particular position" of the latter case may be selected from the job titles defined in the organization information management database that is connected to the system and set as one parameter of the access restriction. For example, if a node has been set with an access restriction allowing read operations only to section chiefs or higher in the XX division, when a user attempts to open a digital document using a duplicate SC derived from that node, the document management server 10 obtains the position of the user from the organization information management database. Reading is permitted if the position satisfies the condition specified in the access restriction and reading is not permitted if the position does not satisfy the condition. Namely, when the user issues a read request for a digital document to the document management server 10 by using a duplicate SC, the document management server 10 checks whether or not there is a node that has been set with control information for access restriction along the path in the derivation relationship tree from the duplicate ID of the duplicate SC to the root. If such a node is found, the value of the control information determines whether or not the duplicate file is to be provided to the user. If there are multiple nodes that have been set with access restrictions along the path and there is at least one condition that does not permit the read operation for that user, the duplicate file may be set so as not to be provided to the user.

This control information may be set by a privileged user, such as a system administrator, or by a user who has been pre-registered into the system and has the right to perform this setting. When a command to set this control information is received from a user, the document management server 10 judges whether the user has the right to perform the setting and then sets the control information only if the user does have the right.

(5) Display Document Designation

This control information specifies a digital document of a certain stage is to be displayed when updates are performed on the digital document body. When employing document updates in the overall management method, document versions can be specified, such as "display version X" (where X is the version number), "display the first version that is found while tracing the derivation relationship tree", and "display the original (document registered at the document registration event)". Furthermore, when performing document updates in the differential management method, documents can be specified, such as "display the document to reflect all differential data while tracing the derivation relationship tree (from the duplicate SC used by the user to the root)", display the document to reflect the differential data from the root of the derivation relationship tree (path until the duplicate SC used by the user) to a particular node" (where the particular node is set as a parameter of this control information), and "display the original". This control information can be set to an arbitrary node in the derivation relationship tree.

When a user attempts to open a digital document using a duplicate SC (namely, when a request for a duplicate file is issued to the document management server 10), the document management server 10 traces the derivation relationship tree to the root with the duplicate ID of the duplicate SC as the origin. The value of the first instance of this control information that is found determines the document content of the duplicate file to be provided to the user. For example, if the first instance of the control information for "display document designation" that is found is "to display version X", a duplicate file that includes the document data for version X is provided to the user.

Furthermore, instead of following the first instance of the control information that is found while tracing the derivation relationship tree to the root, the following type of control is also possible. Namely, if a node that has been set with a value for the "designation of document for display" having a stricter condition than a node that was passed before is reached while tracing the derivation relationship tree, the former has priority. For example, in one method, the older the version that is permitted for display, the stricter the condition that is set. According to this method, the designation of "display the original" becomes the strictest condition. A sequence of strictness for the designation of the display document may be pre-registered into the system. In this method, the display is determined in accordance with the strictest condition while tracing the derivation relationship tree to the root.

Whether to use the first condition that is encountered or the strictest condition while tracing the derivation relationship tree to the root may be pre-registered into the system.

(6) Display Control of Additional Data and Document Attachment

This control information controls the display format of additional data or document attachment for a digital document. The display format has several levels for displaying the additional data or document attachment that has been set to each node in the derivation relationship tree, such as "display only the newest information", "display all information", "display no information". This control information can be set to an arbitrary node in the derivation relationship tree.

When a user attempts to open a digital document by using a duplicate SC, for example, the document management server 10 traces the derivation relationship tree toward the root with the duplicate ID of the duplicate SC as the origin and determines the document content of the duplicate file to be provided to the user in accordance with the value of the first instance of the control information that is found in the trace. If the first instance of the control information for "display control of additional data and document attachment" that is found is "display only the newest information", a duplicate file is provided to the user, where the duplicate file includes the digital document of the original to which only the first detected additional data or document attachment has been added.

Furthermore, instead of following the first instance of the control information that is found while tracing the derivation relationship tree, the following type of control is also possible. Namely, if a node that has been set with control information for "display control of additional data and document attachment" having a stricter display restriction than the value of "display control for update information" in a node that was passed before is reached while tracing the derivation relationship tree, the former node has priority. According to this method, the strictest display restriction while tracing the derivation relationship tree to the root can be employed. A sequence of strictness for the value of the display restriction may be pre-registered into the system.

Whether to use the first control information that is encountered while tracing the derivation relationship tree or the strictest control information when tracing to the root may be pre-registered into the system.

Specific examples of control information were described hereinabove. These types of control information can be set at nodes in the derivation relationship tree. The derivation relationship tree shows the hierarchical relationship between duplicate IDs and may be created from log data of the log management unit 19 as described hereinabove. Therefore, for example, the control information may be set as one item in the log record. An example of this is shown in FIG. 17.

Figure 18:
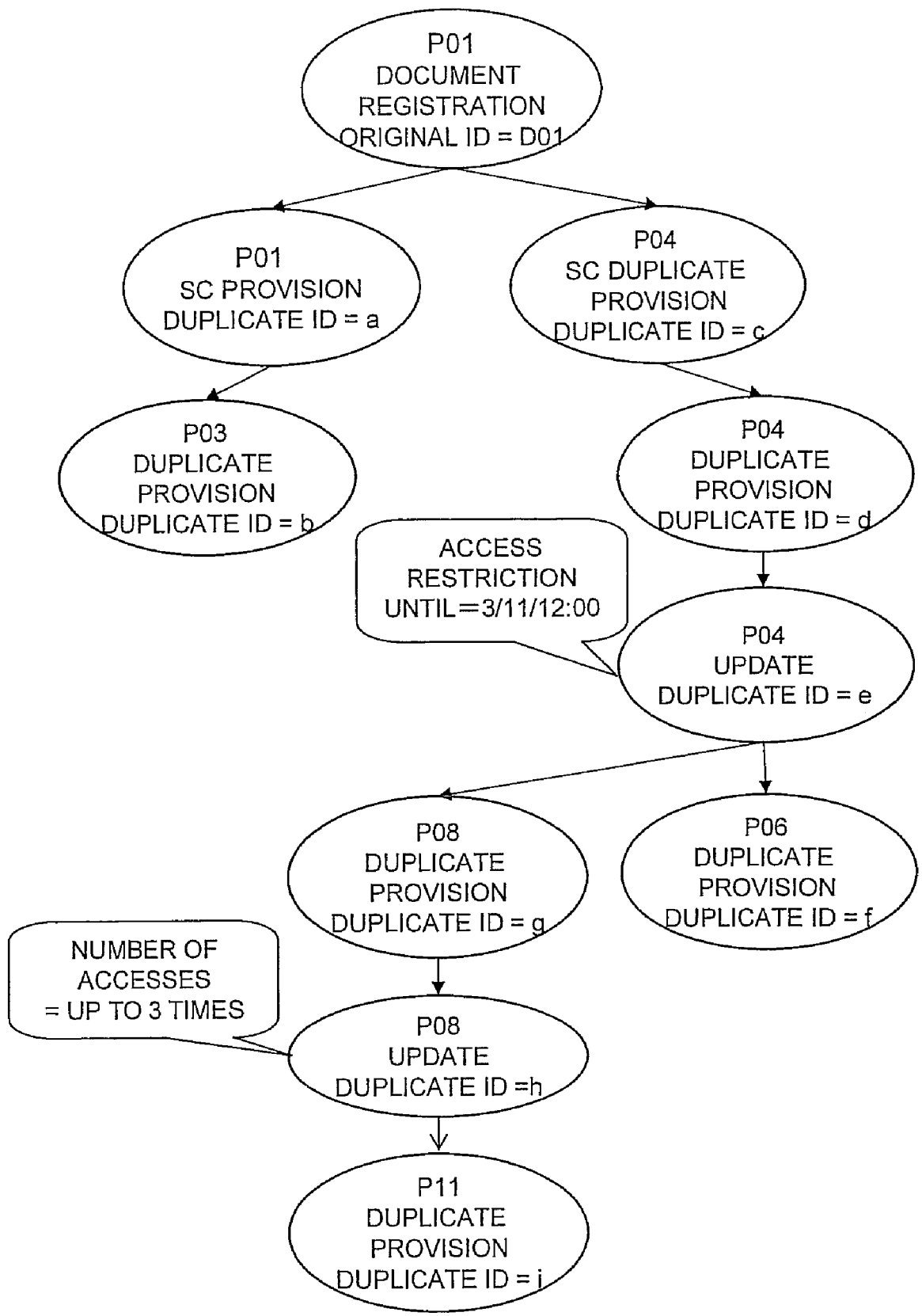
FIG. 18 shows a derivation relationship tree corresponding to the log data of FIG. 17.

In the example of FIG. 17, the access time limit of "3/11" and the number of accesses of "up to 3" are respectively set to the log records of the document update events in lines 6 and 9. Shown in the form of a derivation relationship tree is FIG. 18. In this example, a user has issued a request to the document management server 10 for a duplicate file of a digital document using the duplicate SC for duplicate ID "i". In this case, if a node that includes differential data (or additional data or document attachment) is reached while tracing to the root from the duplicate ID "i", the document management server 10 judges whether or not an "access time limit" or "number of accesses" has been set for that node. If an "access time limit" has been set for that node and the current time has not exceeded the access time limit, the differential data for the node is saved into a buffer, and if the access time limit has been exceeded, the differential data is not saved. Furthermore, if "number of accesses" has been set for that node, the value of a counter for counting the number of accesses is incremented by 1. If the value of the counter does not exceed the value of the "number of accesses", the differential data for the node is saved into a buffer, and if the number of accesses has been exceeded, the differential data is not saved. If the "number of accesses" is set as a total for all users, only one counter need be prepared at that node. If the "number of accesses" is set for every user, a counter needs to be set for every user.

The specific examples (1) to (6) of control information except for (3) described hereinabove relate to public conditions for the update information associated to each node (or update conditions provided to users).

According to the aforementioned exemplary embodiment, if the same digital document is distributed by branching into multiple paths, the operation history of the digital document at a path can be provided for a user on that path. Furthermore, if the digital document is updated individually at each path, data that reflects the updates at a path can be provided for a user on that path. Moreover, this exemplary embodiment enables control information to be set to a node in the derivation relationship tree and the information (updated content, additional data, and so forth) to be provided to a user to be controlled in accordance with control information appearing along a path from a duplicate ID, which is sent to the document management server 10 when a user request the use of a document, to the root of the derivation relationship tree. As a result, for every distribution path of the digital document that is distributed by branching into a tree-configuration, the information to be provided to a user on the path can be controlled.

In the aforementioned exemplary embodiment, the tree showing the derivation relationship among duplicate IDs was expressed from log data stored in the log management unit 19. However, the derivation relationship tree may be created separately from the log data and may be maintained and updated in response to an executed operation.

The "digital document" in the aforementioned exemplary embodiment is not only limited to document data created with a word processor or spreadsheet program but also may include various types of data, such as audio data, image data, video data, multimedia data, and so forth. Therefore, the concept of "reading" a "digital document" includes the playback of audio data, image data, video data, and multimedia data. Namely, the "reading" of a "digital document" in the aforementioned exemplary embodiment includes a generally wide use of digital documents. In other words, in response to an "acquisition request" for a digital document from a user in a system using duplicate SC, the document management server 10 provides a duplicate SC associated to that digital document to the user, and in response to a "usage request" for a digital document using the duplicate SC, a duplicate file that includes a copy of the digital document (or a copy that reflects the differential data or additional data) is provided to the user for "use".

Figure 19:
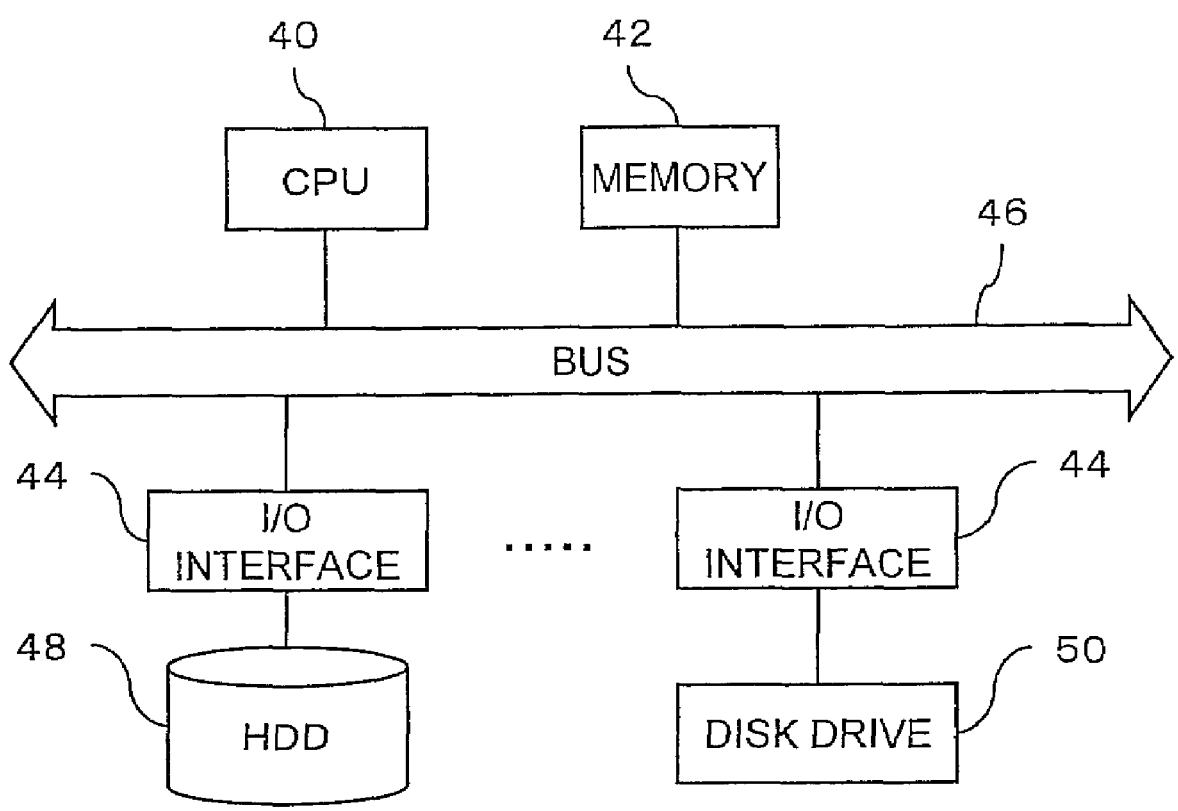
FIG. 19 shows one example of a hardware configuration of a computer to be the basis of the client terminal or document management server of the embodiment.

The document management server 10 forming the system described hereinabove is typically implemented by executing on a general-purpose computer a program that describes the function or processing of each aforementioned part. The computer may have a circuit configuration as shown in FIG. 19 in which a CPU (central processing unit) 40, a memory (primary storage) 42, various I/O interfaces 44, and so forth are connected via a bus 46. Furthermore, a hard disk drive 48 and a disk drive 50 for reading portable non-volatile recording media of various standards, such as CD, DVD, and flash memory, are connected via the I/O interface 44, for example, to the bus 46. The drives 48, 50 function as external storage for memory. The program that describes the processing of the exemplary embodiment is stored in a secondary storage device, such as the hard disk drive 48, via a recording medium, such as a CD or DVD, or via a network, and is installed into the computer. The program stored in the secondary storage device is loaded into memory and executed by the CPU to implement the processing of the document management server 10. The client terminal 20 in the exemplary embodiment can also be implemented similarly by using a general-purpose computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for managing document use in a system including a document management server that manages documents and a client that uses documents, the method comprising:
   receiving an access request from a client and an ID representing a document to be an object of the access request, the received ID being a descendant of a root ID of a tree of derivation relationships;
   issuing, when an operation is performed on the document in response to the access request, a derivative ID, the derivative ID representing the document after the operation is performed;
   adding a derivation relationship between the derivative ID and the received ID to the tree of derivation relationships wherein the added derivation relationship indicates that the derivative ID has a child relationship with respect to the received ID;
   recording attribute information relating to the operation, the attribute information being associated with the received ID or the derivative ID; and
   providing to the client, when the document is provided to the client in response to the access request, response data, the response data including attribute information associated with at least one ID appearing in a path associated with the added derivation relationship, the path being from the received ID accompanying the access request to the root ID of the tree of the derivation relationship but not including the received ID.

2. The method according to claim 1, further comprising:
   recording control information that controls disclosure of the attribute information for each ID; and
   wherein providing the response data to the client comprises controlling whether or not to include attribute information associated with at least one ID appearing in the path associated with the added derivation relationship into the response data in accordance with the control information.

3. The method according to claim 1, wherein:
   the attribute information includes update information for the document or additional information added to the document; and
   wherein providing the response data to the client comprises providing, in the response data, update information or additional information associated with at least one ID appearing in the path associated with the added derivation relationship and a document corresponding to the ID.

4. The method according to claim 1, wherein providing the response data to the client comprises obtaining a derived ID which is a descendant of an ID received together with the access request, and provides to the user response data including attribute information associated with at least one ID appearing in the path associated with the derived ID.

5. A document management server for managing document use comprising:
   a receiving unit that receives an access request from a client and an ID representing a document to be an object of the access request, the received ID being a descendant of a root ID of a tree of derivation relationships;
   an ID processing unit that issues, when an operation is performed on the document in response to the access request, a derivative ID, the derivative ID representing the document after the operation is performed;

said ID processing unit adding a derivation relationship between the derivative ID and the received ID to the tree of derivation relationships wherein the added derivation relationship indicates that the derivative ID has a child relationship with respect to the received ID;

an attribute recording unit that records attribute information relating to the operation, the attribute information being associated with the received ID or the derivative ID; and a response data provider unit that provides to the client, when the document is provided to the client in response to the access request, response data, said response data including attribute information associated with at least one ID appearing in a path associated with the added derivation relationship, the path being from the received ID accompanying the access request to the root ID of the tree of the derivation relationship but not including the received ID.

6. The document management server according to claim 5, further comprising:

an information control unit that controls disclosure of the attribute information for each ID; and wherein the response data provider unit controls whether or not to include attribute information associated with at least one ID appearing in the path associated with the added derivation relationship into the response data in accordance with the information control unit.

7. The document management server according to claim 6, wherein the information control unit specifies a disclosure condition for the attribute information recorded in association with the ID.

8. The document management server according to claim 6, wherein, the information control unit specifies a disclosure condition for attribute information recorded in association with a descendent ID in a path of a given ID.

9. The document management server according to claim 6, wherein the information control unit specifies a disclosure condition for attribute information recorded in association with at least one ID appearing in the path associated with the added derivation relationship.

10. The document management server according to claim 5, wherein:

the attribute information includes update information of the document or additional information that is appended to the document;

the response data provider unit provides response data that includes update information or additional information that has been associated with at least one ID appearing in the path associated with the added derivation relationship and a document corresponding to the ID.

11. The document management server according to claim 5 further comprising:

an information control unit that controls whether or not to permit an update or an addition of additional information to the document at an ID appearing in the path associated with the added derivation relationship; and an update control unit that controls so as to prohibit an update or an addition of additional information to the document when there is an ID that prohibits the update or the addition of additional information to the document in the path associated with the added derivation relationship.

12. The document management server according to claim 5, wherein:

the attribute information that is associated and recorded with the ID includes document data of an updated version obtained as a result of an update operation on the document; and the response data provider unit provides response data including document data of the updated version associated and recorded with an ID appearing in the path associated with the added derivation relationship.

13. The document management server according to claim 12 further comprising:

an information control unit that specifies which one of an original and at least one updated version of the document to be provided to the client in association with an ID in the derivation relationship; and wherein the response data provider unit selects one of the original and at least one updated version of the document that has been associated with an ID appearing in the path associated with the added derivation relationship according to control by the information control unit, and incorporates the selected document into the response data in the response data.

14. The document management server according to claim 5, wherein:

the response data provider unit obtains a derived ID which is a descendant of an ID received together with the access request, and provides to the user response data including attribute information associated with at least one ID appearing in the path associated with the derived ID.

15. A non-transitory computer readable medium storing a program causing a computer to execute a process for document management, the process comprising:

receiving an access request from a client and an ID representing a document to be an object of the access request, the received ID being a descendant of a root ID of a tree of derivation relationships;

issuing, when an operation is performed on the document in response to the access request, a derivative ID, the derivative ID representing the document after the operation is performed;

adding a derivation relationship between the derivative ID and the received ID to the tree of derivation relationships wherein the added derivation relationship indicates that the derivative ID has a child relationship with respect to the received ID;

recording attribute information relating to the operation, the attribute information being associated with the received ID or the derivative ID; and providing to the client, when the document is provided to the client in response to the access request, response data, the response data including attribute information associated with at least one ID appearing in a path associated with the added derivation relationship, the path being from the received ID accompanying the access request to the root ID of the tree of the derivation relationship but not including the received ID.

16. The non-transitory computer readable medium according to claim 15, the process further comprising:

recording control information that controls disclosure of the attribute information for each ID; and wherein providing the response data to the client comprises controlling whether or not to include attribute information associated with at least one ID appearing in the path associated with the added derivation relationship into the response data in accordance with the control information.

17. The non-transitory computer readable medium according to claim 15, wherein:
the attribute information includes update information for the document or additional information added to the document; and
wherein providing the response data to the client comprises providing, in the response data, update information or additional information associated with at least one ID appearing in the path associated with the added derivation relationship and a document corresponding to the ID.

18. The non-transitory computer readable medium according to claim 15, wherein providing the response data to the client comprises obtaining a derived ID which is a descendant of an ID received together with the access request, and provides to the user response data including attribute information associated with at least one ID appearing in the path associated with the derived ID.

19. A system for managing document use comprising:
a document management server that manages documents; and
a client that uses documents;
said document management server including,
a receiving unit that that receives an access request from a client and an ID representing a document to be an object of the access request, the received ID being a descendant of a root ID of a tree of derivation relationships,
an ID processing unit that issues, when an operation is performed on the document in response to the access request, a derivative ID, the derivative ID representing the document after the operation is performed,
said ID processing unit adding a derivation relationship between the derivative ID and the received ID to the tree of derivation relationships wherein the added derivation relationship indicates that the derivative ID has a child relationship with respect to the received ID,
an attribute recording unit that records attribute information relating to the operation, the attribute information being associated with the received ID or the derivative ID, and
a response data provider unit that provides to the client, when the document is provided to the client in response to the access request, response data, said response data including attribute information associated with at least one ID appearing in a path associated with the added derivation relationship, the path being from the received ID accompanying the access request to the root ID of the tree of the derivation relationship but not including the received ID;
said client including,
an ID management unit that stores an ID that is included in response data received from the document management server in response to an access request relating to a document as an ID representing the document, and
a transmitting unit that transmits, when sending an access request to the document management server, an ID representing a document to be an object of the access request.

* * * * *